(12) United States Patent
Muhassin et al.

(10) Patent No.: US 12,288,362 B2
(45) Date of Patent: Apr. 29, 2025

(54) ACTIVE ALIGNMENT OF AN OPTICAL ASSEMBLY WITH INTRINSIC CALIBRATION

(71) Applicant: Motional AD LLC, Boston, MA (US)

(72) Inventors: Nijumudheen Muhassin, Pittsburgh, PA (US); Jayesh Dwivedi, Pittsburgh, PA (US); Yew Kwang Low, Singapore (SG)

(73) Assignee: MOTIONAL AD LLC, Boston, MA (US)

( * ) Notice: Subject to any disclaimer, the term of this patent is extended or adjusted under 35 U.S.C. 154(b) by 522 days.

(21) Appl. No.: 17/581,712

(22) Filed: Jan. 21, 2022

(65) Prior Publication Data

US 2023/0237701 A1 Jul. 27, 2023

(51) Int. Cl.
*G06T 7/80* (2017.01)
*G01M 11/02* (2006.01)
(Continued)

(52) U.S. Cl.
CPC ............ *G06T 7/80* (2017.01); *G02B 27/30* (2013.01); *G01S 7/4004* (2013.01); *G01S 7/497* (2013.01); *G01S 13/865* (2013.01); *G01S 13/867* (2013.01); *G01S 17/86* (2020.01); *G06T 2207/30244* (2013.01)

(58) Field of Classification Search
CPC ............ G06T 7/80; G06T 2207/30244; G06T 2207/30252; G06T 2207/10004; G02B 27/30; G02B 27/62; G02B 7/003; G02B 7/005; G02B 27/4205; G02B 27/4255; G01S 7/4004; G01S 7/497; G01S 13/865; G01S 13/867; G01S 17/86; G01S 2013/9318; G01S 2013/93185;
(Continued)

(56) References Cited

U.S. PATENT DOCUMENTS 3,912,395 A 10/1975 Voggenthaler
8,576,390 B1 11/2013 Nunnink
(Continued)

FOREIGN PATENT DOCUMENTS

CN 107833254 A 3/2018
EP 3862806 A1 8/2021
(Continued)

OTHER PUBLICATIONS

U.S. Appl. No. 17/360,842, filed Jun. 28, 2021, Muhassin et al.
(Continued)

*Primary Examiner* — John W Lee
(74) *Attorney, Agent, or Firm* — Knobbe Martens Olson & Bear LLP

(57) ABSTRACT

Provided are methods for active alignment of an optical assembly with intrinsic calibration. Some methods described include performing a first active alignment using a multi-collimator assembly, determining a principal point of the camera assembly using a diffractive optical element (DOE) intrinsic calibration module, and adjusting the relative position of one or more of the lens and the image sensor to align the principal point of the camera assembly with an image center of the image sensor and to perform a second active alignment. Systems and computer program products are also provided.

20 Claims, 24 Drawing Sheets

(51) Int. Cl.
  *G01S 7/40* (2006.01)
  *G01S 13/86* (2006.01)
  *G01S 13/931* (2020.01)
  *G01S 17/86* (2020.01)
  *G02B 7/00* (2021.01)
  *G02B 27/30* (2006.01)
  *G02B 27/42* (2006.01)
  *G03B 5/00* (2021.01)
  *G05D 1/00* (2024.01)
  *G01S 7/497* (2006.01)

(58) Field of Classification Search
  CPC .......... G01S 2013/9319; G01S 13/931; G01M 11/0264; G01M 11/0221; G03B 5/00; G05D 1/0246
  See application file for complete search history.

(56) References Cited

U.S. PATENT DOCUMENTS

| | | | |
|---|---|---|---|
| 8,773,514 B2 | 7/2014 | Gharib et al. | |
| 9,438,813 B2 | 9/2016 | Gilbert | |
| 10,788,316 B1 | 9/2020 | Kalscheur | |
| 11,070,709 B2 | 7/2021 | Lee et al. | |
| 11,636,623 B2 | 4/2023 | Muhassin et al. | |
| 12,051,224 B2 | 7/2024 | Muhassin et al. | |
| 2012/0154636 A1 | 6/2012 | De Haan | |
| 2013/0121617 A1 | 5/2013 | Serrels et al. | |
| 2014/0307055 A1 | 10/2014 | Kang et al. | |
| 2015/0253123 A1 | 9/2015 | Braker et al. | |
| 2016/0356978 A1 | 12/2016 | Osborne | |
| 2018/0164490 A1 | 6/2018 | Ma et al. | |
| 2019/0011567 A1 | 1/2019 | Pacala et al. | |
| 2019/0147625 A1* | 5/2019 | Jia .................. | H04N 13/246 348/187 |
| 2020/0133001 A1 | 4/2020 | Guido et al. | |
| 2020/0257353 A1 | 8/2020 | Dai | |
| 2020/0257356 A1 | 8/2020 | Rosell | |
| 2020/0264043 A1 | 8/2020 | Allen | |
| 2021/0033255 A1 | 2/2021 | Kuffner, Jr. | |
| 2021/0044725 A1 | 2/2021 | Powell | |
| 2021/0112238 A1 | 4/2021 | Bylicka et al. | |
| 2021/0196113 A1* | 7/2021 | Copland .............. | A61B 3/1015 |
| 2021/0223568 A1* | 7/2021 | Makinen ............... | G02B 27/30 |
| 2021/0233274 A1 | 7/2021 | Silva | |
| 2021/0240005 A1* | 8/2021 | Fattal .................. | G02B 6/0051 |
| 2021/0390739 A1* | 12/2021 | Jia .......................... | G01B 11/25 |
| 2022/0414930 A1 | 12/2022 | Muhassin et al. | |
| 2023/0334701 A1 | 10/2023 | Muhassin et al. | |

FOREIGN PATENT DOCUMENTS

| | | |
|---|---|---|
| GB | 2417790 A | 3/2006 |
| JP | 2008-154195 A | 7/2008 |
| WO | WO 2016/160704 A1 | 10/2016 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Bauer, M et al., "Geometrical camera calibration with diffractive optical elements", Optics Express, Dec. 2008, vol. 16, pp. 20241-20248.
Great Britain Office Action issued for Application No. GB 2203405.2, dated Sep. 12, 2022.
Great Britain Office Action issued for Application No. GB 2203405.2, dated Mar. 13, 2023.
Great Britain Office Action issued for Application No. GB 2203405.2, dated Aug. 25, 2023.
Great Britain Office Action issued for Application No. GB 2203487.0, dated Sep. 14, 2022.
Great Britain Office Action issued for Application No. GB 2203487.0, dated Nov. 6, 2023.
Korean Office Action issued for Application No. KR 10-2022-0038215, dated Jan. 17, 2024.
Korean Office Action issued for Application No. KR 10-2022-0037543, dated Jan. 12, 2024.
Korean Notice of Allowance issued for Application No. KR 10-2022-0030283, dated Feb. 26, 2024.
Great Britain Office Action issued for Application No. GB 2203178.5, dated Aug. 31, 2022.

* cited by examiner

| View Angle | N1 | N2 | tetha 1 | tetha 2 | DOE Surface Angle |
|---|---|---|---|---|---|
| 2 | 1.5158 | 1 | 3.86 | 5.86 | 86.14 |
| 4 | 1.5158 | 1 | 7.65 | 11.65 | 82.35 |
| 6 | 1.5158 | 1 | 11.32 | 17.32 | 78.68 |
| 8 | 1.5158 | 1 | 14.81 | 22.81 | 75.19 |
| 10 | 1.5158 | 1 | 18.08 | 28.08 | 71.92 |
| 12 | 1.5158 | 1 | 21.11 | 33.11 | 68.89 |
| 14 | 1.5158 | 1 | 23.88 | 37.88 | 66.12 |
| 16 | 1.5158 | 1 | 26.39 | 42.39 | 63.61 |
| 18 | 1.5158 | 1 | 28.64 | 46.64 | 61.36 |
| 20 | 1.5158 | 1 | 30.65 | 50.65 | 59.35 |
| 22 | 1.5158 | 1 | 32.43 | 54.43 | 57.57 |
| 24 | 1.5158 | 1 | 33.99 | 57.99 | 56.01 |
| 26 | 1.5158 | 1 | 35.35 | 61.35 | 54.65 |
| 28 | 1.5158 | 1 | 36.53 | 64.54 | 53.47 |
| 30 | 1.5158 | 1 | 37.54 | 67.55 | 52.46 |

FIG. 17

ACTIVE ALIGNMENT OF AN OPTICAL ASSEMBLY WITH INTRINSIC CALIBRATION

BACKGROUND

Alignment of a lens and image sensor in an optical assembly, such as a camera assembly, can be important for the optical performance for the optical assembly. In general, active alignment is a process that involves aligning an optical center of the lens with an optical center of the sensor. Additionally, decentration of a principal point from the image center of the optical assembly is a common issue for many optical assemblies, and can be especially common for optical assemblies with a moderate to narrow field of view.

BRIEF DESCRIPTION OF THE FIGURES

FIG. 17 is a diagram showing the shapes of the image of FIG. 15 sorted into an order as part of a process for geometric intrinsic camera calibration using a diffractive optical element;

DETAILED DESCRIPTION

Figure 1:
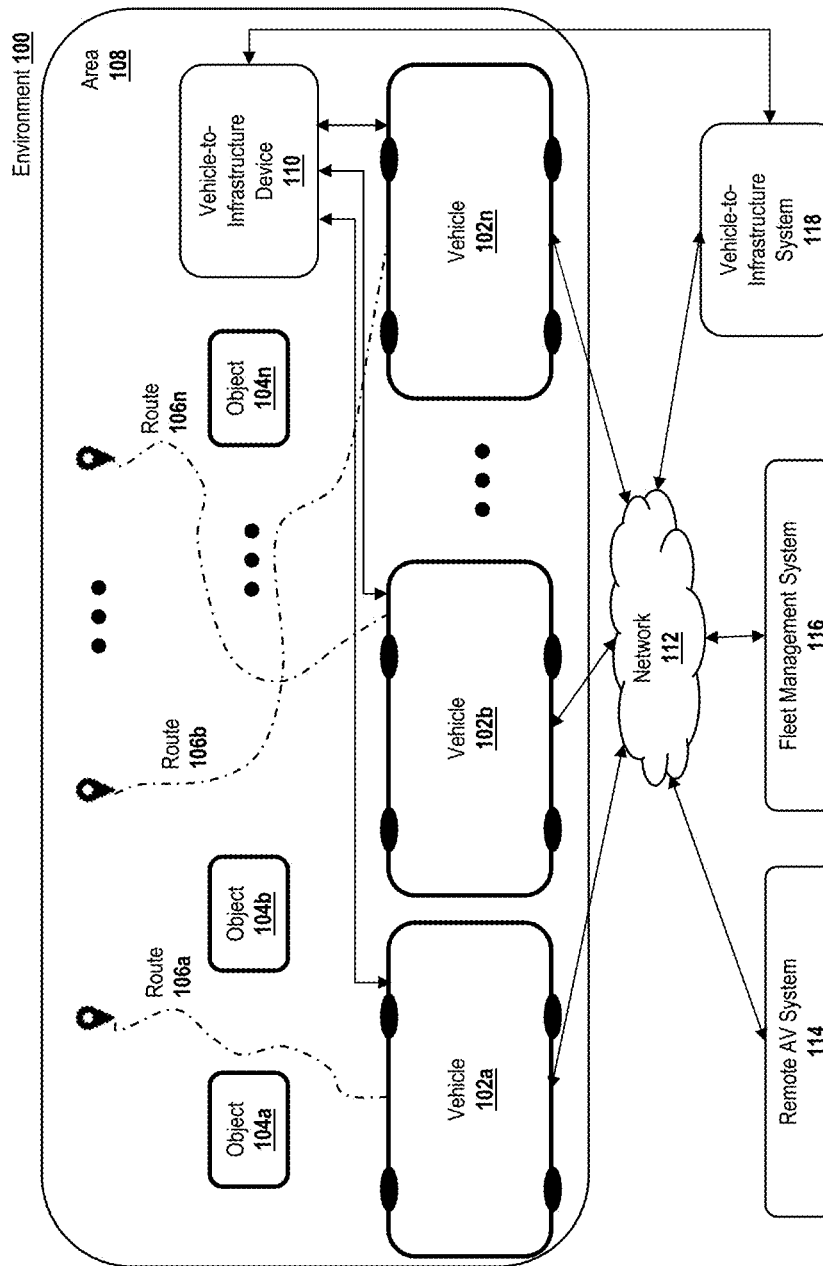
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement active alignment with intrinsic calibration. For example, this application provides systems and methods for improved processes for actively aligning a lens and an image sensor of a camera assembly. In some embodiments, first, an active alignment is first performed based on a plurality of targets projected by a multi-collimator assembly. Then, the principal point of the camera assembly is determined based on an intrinsic calibration process performed using a DOE intrinsic calibration module that is moved into the optical path of the camera assembly. Next, the DOE intrinsic calibration module is removed, and the image center of the image sensor is aligned with the principal point. Finally, the modulation transfer function (MTF) is optimized based on the plurality of MTF targets.

By virtue of the implementation of systems, methods, and computer program products described herein, techniques for active alignment with intrinsic calibration provide improved performance for assembled optical systems by minimizing decentration or misalignment between a lens and an image sensor. In general, active alignment of a lens and image sensor in a camera assembly is extremely important for the optical performance for the camera assembly. In some embodiments, the methods and systems of this application provide active alignment using a DOE-collimator intrinsic calibration module that is relatively small in size and which can be implemented in the active alignment process.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1.

Additionally, or alternatively, at least one set of elements of environment 100 can perform one or more functions described as being performed by at least one different set of elements of environment 100.

Figure 2:
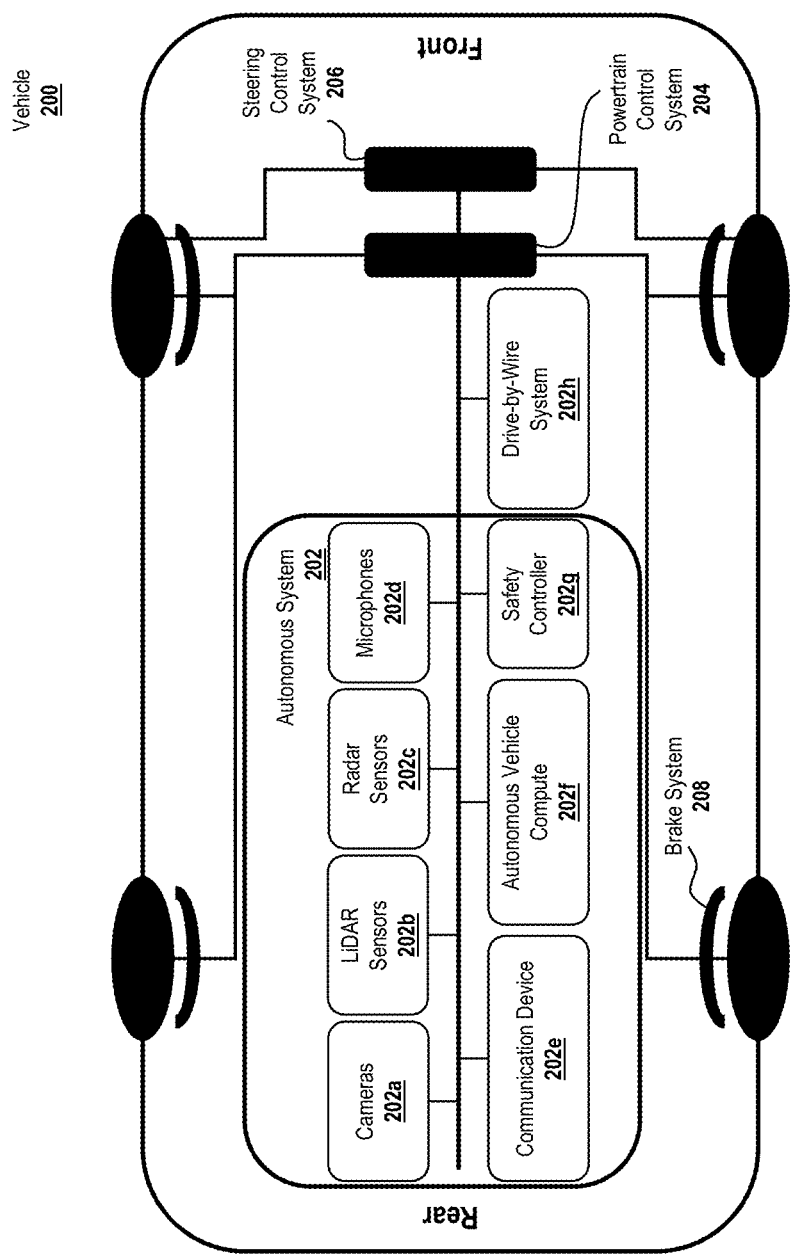
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
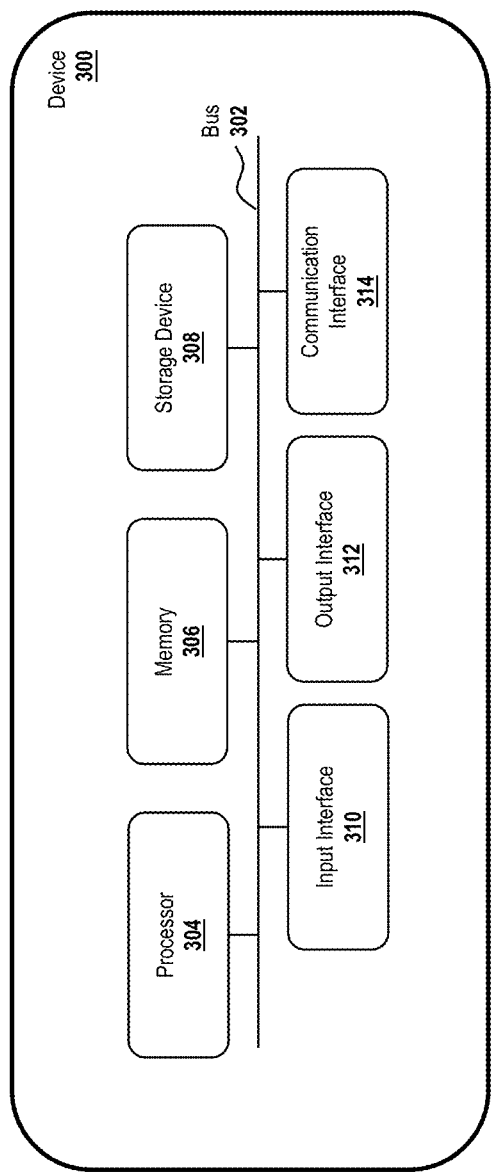
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device vehicles 200, and/or one or more devices of network 112 (e.g., one or more devices of a system of network 112). In some embodiments, one or more devices of vehicles 102 (e.g., one or more devices of a system of vehicles 102), one or more devices of vehicle 200, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
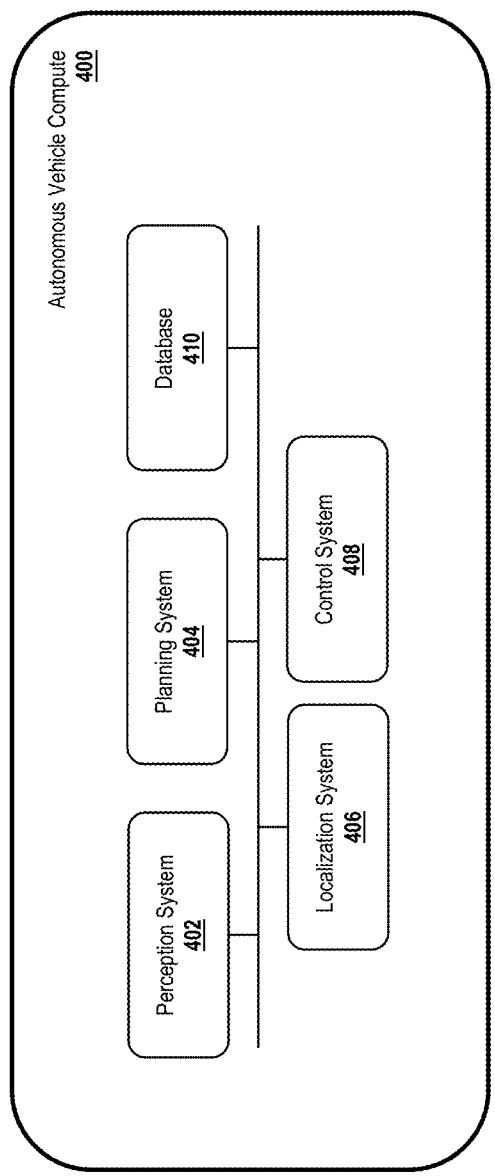
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

As described above, autonomous systems, such as those described with respect to FIGS. 1-4, can rely on the input of, among other things, one or more optical or camera systems or assemblies. For example, the autonomous systems 202 of the vehicle 200 includes cameras 202a described above. In some instances, improving the quality of these optical or camera assemblies can improve the functionality of the autonomous system. For example, improving the quality and/or accuracy of images collected by the cameras 202a can improve the ability of autonomous system 202 to operate the vehicle 200 in a safe, efficient, and accurate manner.

Many factors contribute to the quality of optical or camera assemblies. For example, alignment between a lens and an image sensor of a camera system can be important. In some instances, when constructing camera assemblies, an active alignment process is completed in an effort to align the lens and the image sensor. Active alignment of lens and image sensor can be extremely important for the optical performance for the camera system. In general, active alignment can include the process for aligning an optical center of the lens with an optical center of the image sensor.

Traditional alignment techniques (e.g., those used prior to the concepts described in this application) have required the use of several large pieces of equipment, and thus traditional active alignment techniques have been expensive and difficult to perform. These techniques have generally used the large pieces of equipment to compute the principal point of a preliminarily pre-cured aligned camera system during the active alignment process. With these traditional techniques, it was generally very difficult or impossible to measure and control the decentration of the optical axis or principal point during active alignment of the camera assembly. These disadvantages can be, in some embodiments, resolved or ameliorated with the novel and nonobvious active alignment processes described herein. The active alignment processes of the present application can, in some embodiments, utilize a compact and reduced size diffractive optical element (DOE)-collimator intrinsic calibration module within the active alignment process.

Decentration of the principal point from the image center of the camera assembly (e.g., misalignment between the lens and the image sensor) can be a common issue for many camera assemblies, including those that are often used in autonomous systems, such as those described above with reference to FIGS. 1-4. In some instances, the problems associated with decentration are particularly present or impactful in camera assemblies with moderate to narrow field of views (FOVs).

The degree of decentration (e.g., the misalignment) of a camera system can be measured. However, pervious methodologies have typically involved measuring decentration after the camera assembly has been assembled. This can be problematic as, once the camera assembly is assembled (e.g., the lens is fixed relative to the image sensor), it is no longer possible to make physical corrections to decentration. For camera systems that will be used in autonomous systems, where certain degrees of decentration are no not desirable or even acceptable, this can lead to many camera systems not being suitable for use. For example, a manufacturer of autonomous systems may effectively throw out a number of preassembled camera systems owing to the degree of their decentration. This is, of course, can be efficient and not desirable.

The previous active alignment equipment (e.g., the large pieces of equipment described above), are not able to measure the principal point of the camera system during an active alignment process. This is because the equipment that could measure the principal point has generally been too large to include in the active alignment process.

As described in this application, however, is possible to incorporate a DOE-intrinsic calibration module, which can be compact enough to fit into the active alignment equipment, that can be configured to be capable of measuring the principal point during active alignment. In this way, the image center of the image sensor can be subsequently aligned to the measured principal point location during the active alignment process. This can advantageously greatly improve the quality of the camera systems by minimizing decentration.

In particular, some embodiments described herein, can utilize a folding mirror that is aligned with respect to the DOE to reflect dots (or other patterns) projected by the DOE onto the field of view of the camera assembly. In some instances, the alignment between the mirror and the DOE can be fixed. DOEs of known grating angle can be used as beam splitters to enable the capture of an image with an n by m grid of diffraction points. Form this grid of diffraction points, various intrinsic parameters of the optical system, including the principal point, can be determined.

Figure 5:
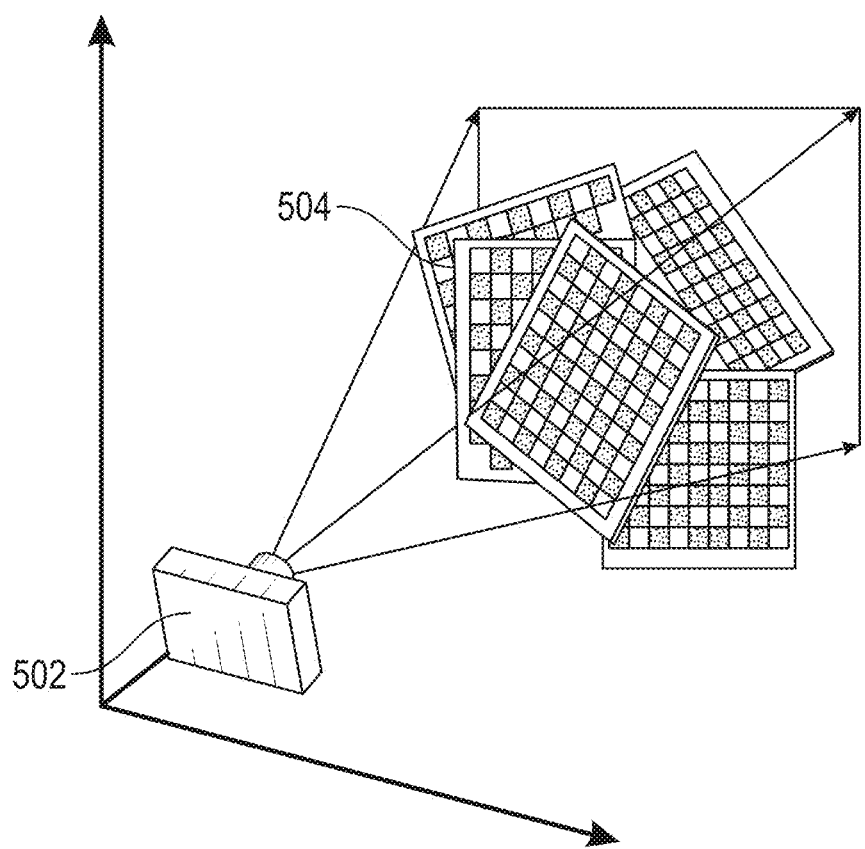
FIG. 5 illustrates an example of a process for determining the principal point of a camera system.

FIG. 5 illustrates an example of a prior process for determining the principal point of a camera system. In this example, in order to determine the principal point, a camera 502 must capture a plurality of images of a target, such as the checkerboard target 504 illustrated in FIG. 5, in a plurality of different positions. The algorithms used to determine the principal point of the camera 502 relied on several different poses or observations of the target with different orientations in order to estimate the camera parameters by minimizing a nonlinear error function. Due to the size of the target 504, the need to manipulate the target 504 through a plurality of various poses, and/or the large hyperfocal distances of the camera 502, this method is not suitable to be incorporated into typical active alignment metrology.

This application describes the use of a DOE-collimator intrinsic calibration metrology during the active alignment process. Several aspects of the DOE-collimator intrinsic calibration metrology are described in U.S. patent application Ser. No. 17/360,842, filed Jun. 28, 2021, which is incorporated herein by reference in its entirety and for all purposes. According to this metrology, a gird of points of diffracted beams are provided as the virtual sources (e.g., the laser beams observed by the camera) are pointed at infinity. This allows the resulting images to be, in some respects, similar to a starry sky, which can make the images captured invariant against translation. This can be a key feature and advantage of some embodiments of this method which allows camera calibration to be done with a single image avoiding complex bundle adjustments. Additionally, the DOE-collimator intrinsic calibration can be produced at a compact scale that can be incorporated into an active alignment process.

FIGS. 6-17 illustrate examples of a DOE-collimator intrinsic calibration module according to one embodiment, as well as associated methods of manufacture and use of the same. As will be described further below, such a DOE-collimator intrinsic calibration module can be utilized during an active alignment process to reduce decentration.

Figure 6:
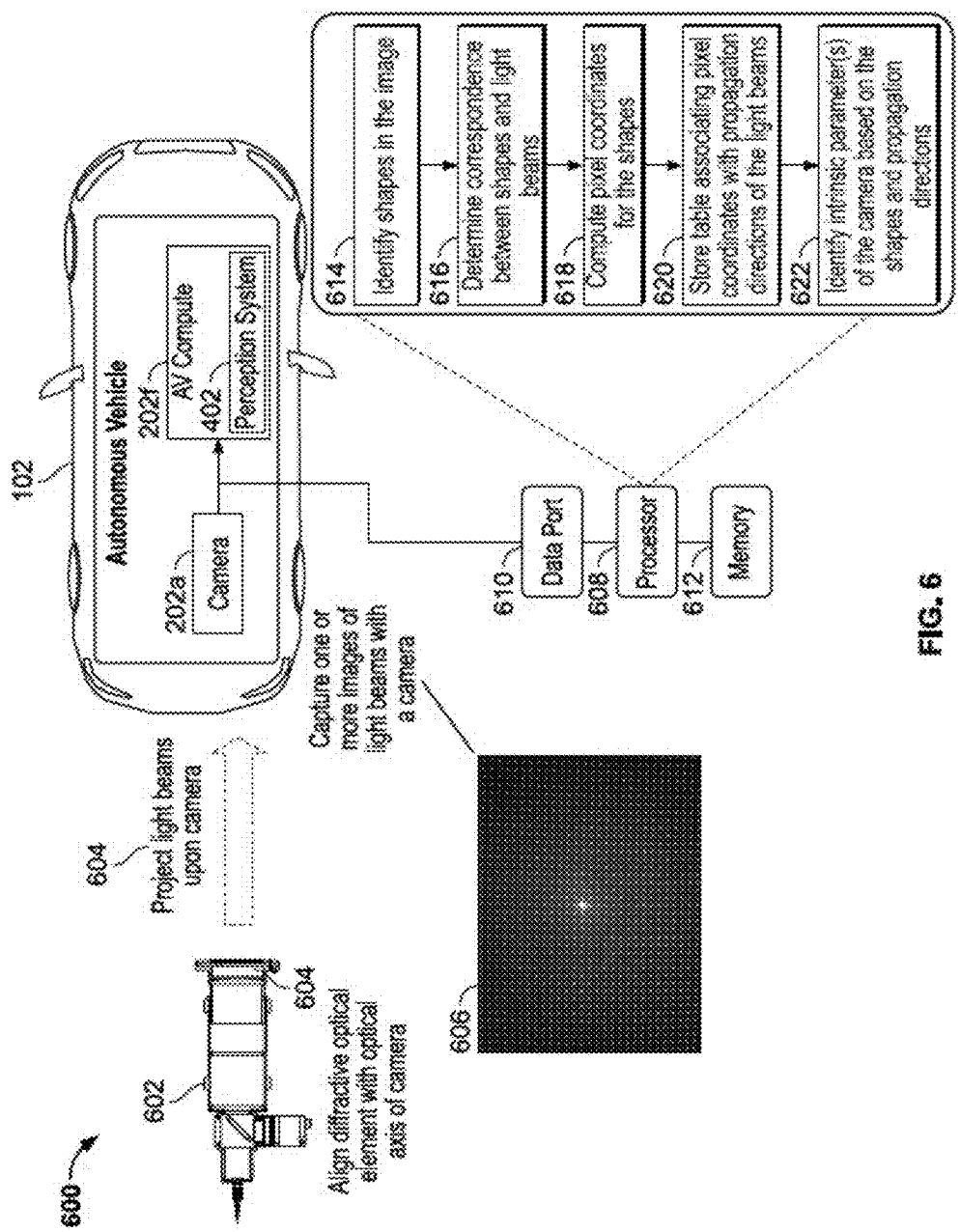
FIG. 6 is a diagram of an implementation of a process for geometric intrinsic camera calibration using a diffractive optical element.

Referring now to FIG. 6, illustrated is a diagram of an implementation of a process 600 for geometric intrinsic camera calibration using a diffractive optical element. In some embodiments, one or more of the steps described with respect to process 600 are performed (e.g., completely, partially, and/or the like) by autonomous vehicle 102, as above. Additionally or alternatively, in some embodiments one or more steps described with respect to process 600 may be performed (e.g., completely, partially, and/or the like) by another device or group of devices separate from or including autonomous vehicle 102, such as a remote server (e.g., a remote server that is the same as or similar to remote AV system 114 and/or fleet management system 116 of FIG. 1) carrying out some or all of the above calculations.

As shown in FIG. 6, a device 602 including a diffractive optical element 604 is aligned with an optical axis of a camera 202a (e.g., which may be affixed to autonomous vehicle 102 in some examples). Device 602 projects light beams 604 upon camera 202a via the diffractive optical element 604. Each of light beams 604 has a propagation direction associated with a corresponding view angle from among multiple view angles of camera 202a. Camera 202a captures an image 606 based on light beams 604 and forward the image to one or more processors 608 via data port 610. Processor 608 executes instructions stored in memory 612 to identify (614) shapes in the received image 606, determine (616) a correspondence between the shapes in the image 606 and the light beams 604, compute (618) pixel coordinates for the shapes, store (620) a table associating the pixel coordinates with corresponding propagation directions of the light beams 604, and identify (622) one or more intrinsic parameters of the camera that minimize a reprojection error function based on the shapes in the image 606 and the propagation directions.

Figure 7:
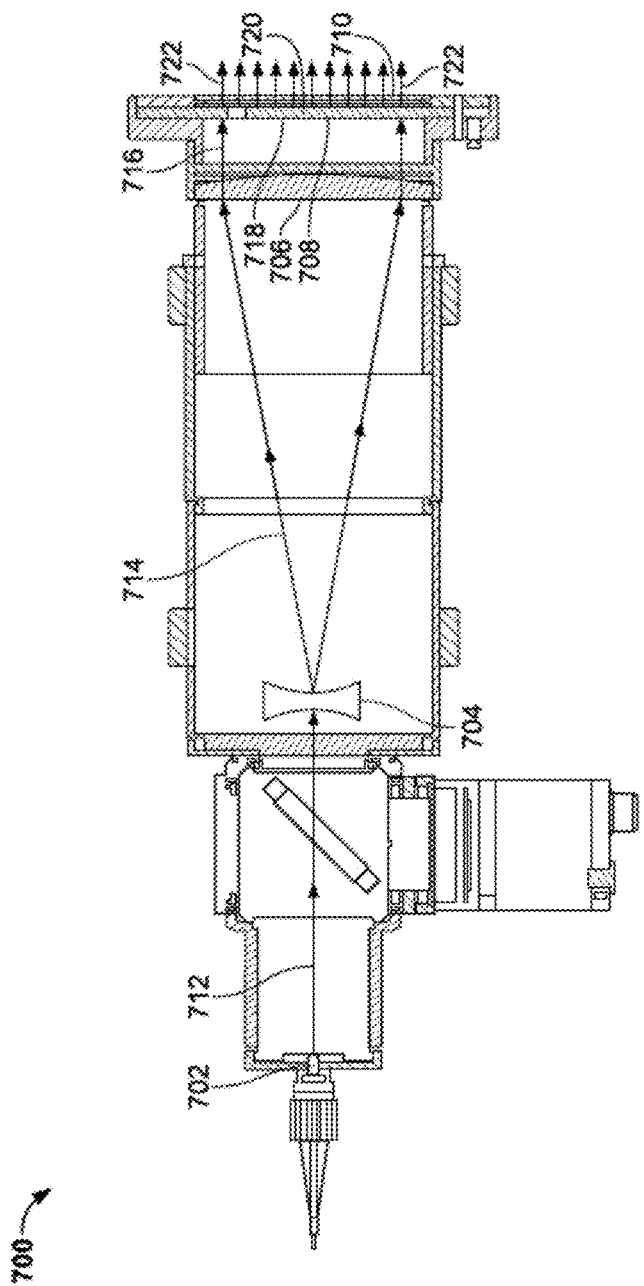
FIG. 7 is a diagram of an implementation of a geometric intrinsic camera calibration system including a diffractive optical element.

Referring now to FIG. 7, illustrated is a diagram of an implementation of a geometric intrinsic camera calibration system 700. In some embodiments, system 700 includes a laser 702 (e.g., a solid-state laser), a beam expanding lens 704, a collimator 706, a diffractive optical element 708 (which, for example, may be the same as, or similar to, one or more diffractive optical element(s) described elsewhere herein), and a protective window 712. Laser 702 is configured to output a first light beam 712 toward collimator 706, optionally by way of beam expanding lens 704. In some examples, beam expanding lens 704 is configured to expand the first light beam 712 into an expanded light beam 714 and provide the expanded light beam to collimator 706. In still other examples, collimator 706 is a beam expanding type of collimator that is configured to expand the first light beam 712 output by the laser 702, thereby causing a diameter of the collimated light beam 716 to be greater than a diameter of the first light beam 712 output by the laser 702. Collimator 706 is arranged along an optical path of laser 702 and is configured to output a collimated light beam 716 based on the first light beam 712 (or the expanded light beam 714, as the case may be) received from laser 702 (and/or beam expanding lens 704).

Diffractive optical element 708 is arranged along an optical path of collimator 706 and includes a first surface 718 and a second surface 720. First surface 718 (e.g., a flat side) includes a mask (not separately shown in FIG. 7) having apertures corresponding to view angles of a camera (e.g., camera 202a, not separately shown in FIG. 7). Second surface 720 includes ridges (not separately shown in FIG. 7) corresponding to the view angles, each ridge having a ridge angle associated with the corresponding view angle. Diffractive optical element 708 is configured to split the collimated light beam 716 into multiple light beams 722 by passing the collimated light beam 716 through apertures (e.g., such as apertures 808 shown in FIG. 8), and output the light beams 722 through the ridges to a lens (not separately shown in FIG. 7) of the camera for calibration, the light beams 722 being output in respective propagation directions based on the ridge angles. In one example, the light beams 722 are configured during a design phase of the DOE 708. In such an example, a grating angle of the DOE 708 is predetermined based on a desired number of light beams (e.g., light beams 722) in which the primary light beam 712 is to be split, for instance, by utilizing equations (1), (2), and (3) in the manner described below. In another example, various aspects of the DOE 708 are configured during a design phase based on a field of view and/or a resolution of a camera that is to be tested utilizing the DOE 708. For instance, for a camera having a field of view of 30 degrees and a resolution of 2 degrees, the DOE 708 may be configured to split a primary light beam (e.g., the same as or similar to light beam 712) into 15 light beams (e.g., the same as or similar to light beams 722) to cover each 2-degree resolution interval from among the 30 degrees of the field of view. A size of a primary light beam (e.g., the same as or similar to light beam 712) and/or a size of the multiple light beams (e.g., the same as or similar to light beams 722) into which the primary light beam is split by the DOE 708, in another aspect, may be defined based on a cross-sectional area of the DOE 708, such as by sizing the apertures (e.g., apertures 808 of FIG. 8) to utilize a maximal amount of cross-sectional area of a side (e.g., side 806 of FIG. 8) of the DOE 708. In some examples, diffractive optical element 708 is further configured to project the light beams 722 through the lens and upon an image sensor of the camera, when optical axes of laser 702, beam expanding lens 704, collimator 706, diffractive optical element 708, and camera are mutually aligned, to enable the image sensor to capture an image of the light beams 722 for intrinsic calibration. In such examples, the diffractive optical element 708 may be further configured to cause a grid of points to be formed on the image sensor of the camera based on the projected light beams, with the grid of points corresponding to the view angles of the camera and enabling calculation of at least one intrinsic parameter (e.g., orientation of the diffractive optical element 708, focal length of the camera, principal point of the camera, distortion of the orientation of the camera). In some embodiments, each point of the grid of points appears to originate from an infinite distance from the camera, to emulate a calibration "target" similar to a use case of cameras 202a of autonomous vehicle 102.

Figure 8:
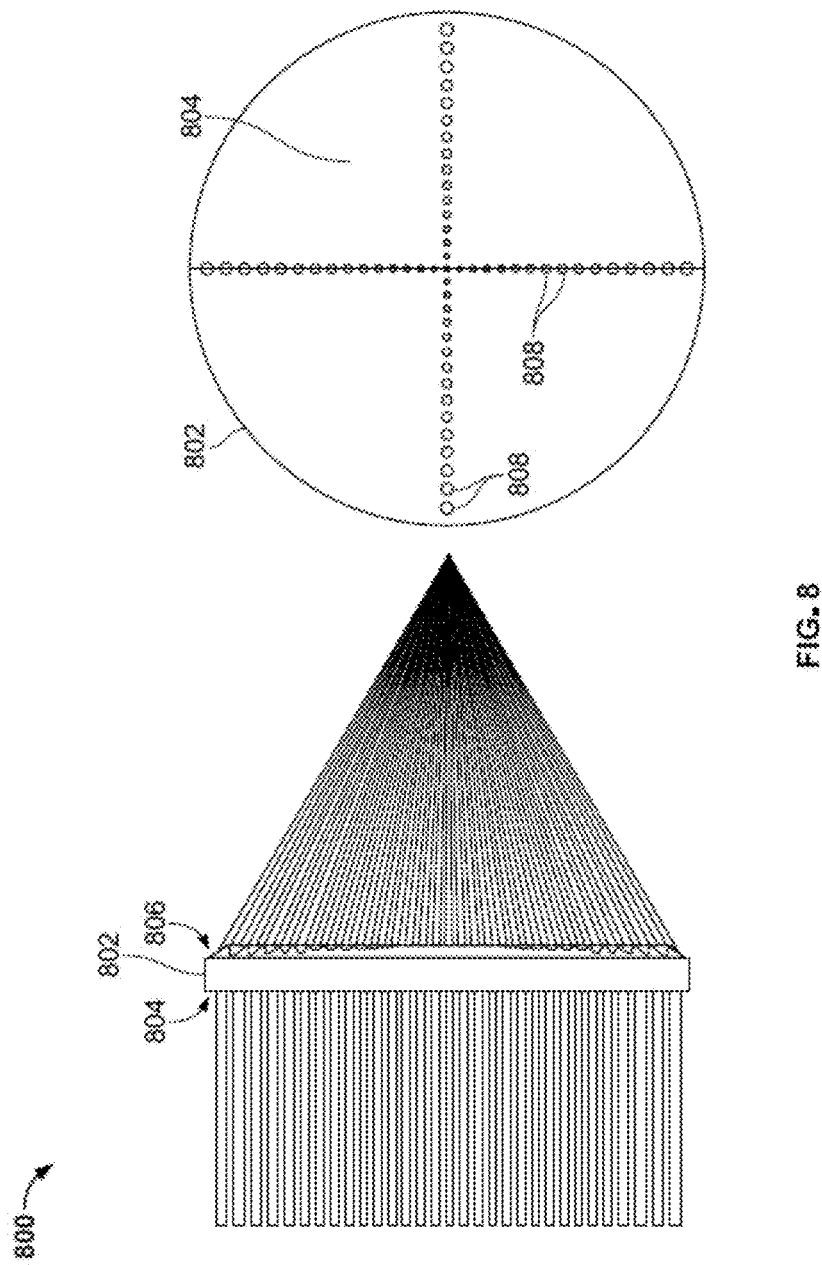
FIGS. 8 and 9 are diagrams of implementations of diffractive optical elements for geometric intrinsic camera calibration.
Figure 9:
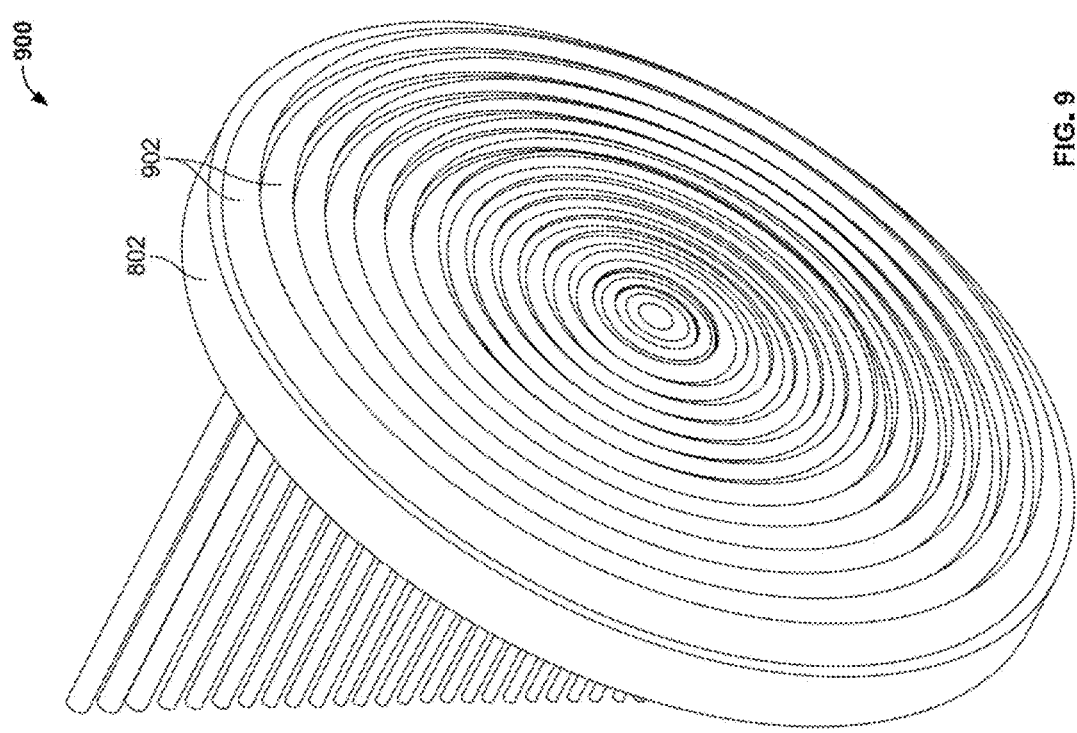

Referring now to FIGS. 8 and 9, illustrated are diagrams 800 and 900 of implementations of diffractive optical elements (which, for example, may be the same as, or similar to, diffractive optical element 708 or any other diffractive optical element(s) described herein). In some embodiments, as shown in FIG. 8, diffractive optical element 802 includes a first surface 804 and a second side 806. The first surface 804 includes apertures 808, which, in some embodiments, are arranged in a crosshair pattern. In one example, the apertures 808 are etched into a flat surface to form a mask on the first surface 804 of the diffractive optical element 802. In some examples, the diffractive optical element 802 and the apertures 808 are circular, and diameters of the apertures 808 decrease in a direction from an edge of the diffractive optical element 802 toward a center of the diffractive optical element 802. With continued reference to FIG. 8 and FIG. 9, in some examples, diffractive optical element 802 includes ridges 902 that are arranged in concentric circles on the second surface 806 of the diffractive optical element 802. In such examples, the apertures 808 are arranged along optical paths of the ridges 902.

Figure 10:
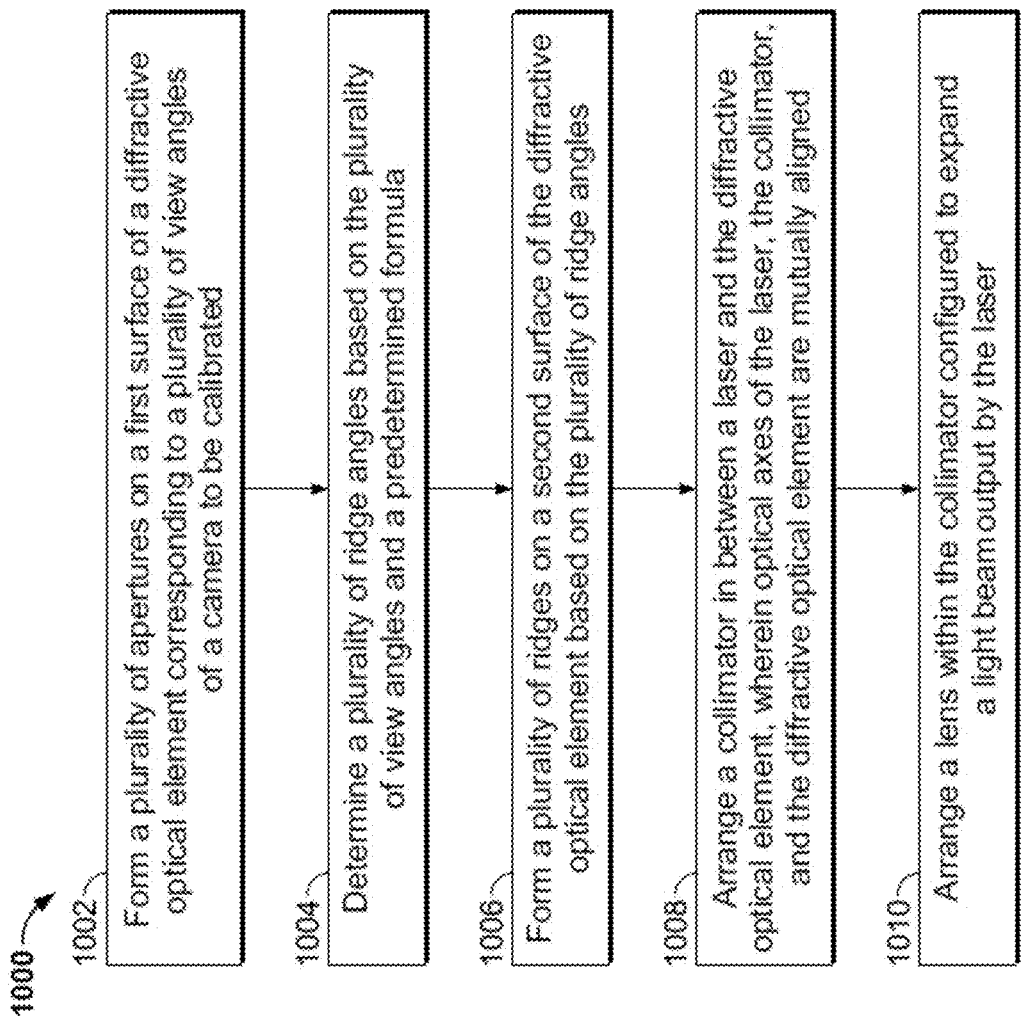
FIG. 10 is a flowchart of a process for manufacturing a geometric intrinsic camera calibration system including a diffractive optical element.

Referring now to FIG. 10, illustrated is a flowchart of a process 1000 for manufacturing a geometric intrinsic camera calibration system including a diffractive optical element. In some embodiments, one or more of the steps described with respect to process 1000 are performed (e.g., completely, partially, and/or the like) by autonomous vehicle 102, as above. Additionally or alternatively, in some embodiments one or more steps described with respect to process 1000 may be performed (e.g., completely, partially, and/or the like) by another device or group of devices separate from or including autonomous vehicle 102, such as a remote server (e.g., a remote server that is the same as or similar to remote AV system 114 and/or fleet management system 116 of FIG. 1) carrying out some or all of the above calculations.

With continued reference to FIG. 10, apertures are formed on a first surface of a diffractive optical element corresponding to a plurality of view angles of a camera to be calibrated (block 1002). Processor 608 (or any other suitable processor) determines ridge angles based on the view angles and based on a predetermined formula (e.g., Snell's law) (block 1004), as described in further detail in connection with FIG. 11. Ridges are formed on a second surface of the diffractive optical element based on the ridge angles (block 1006). A collimator is arranged in between a laser and the diffractive optical element, with optical axes of the laser, the collimator, and the diffractive optical element being mutually aligned (block 1008). Arranging the collimator in between the laser and the diffractive optical element, in some examples, includes fixing a distance from the laser to the collimator and fixing a distance from the collimator to the diffractive optical element. In some examples, a lens is arranged within the collimator and is configured to expand a light beam output by the laser (block 1010).

Figure 11:
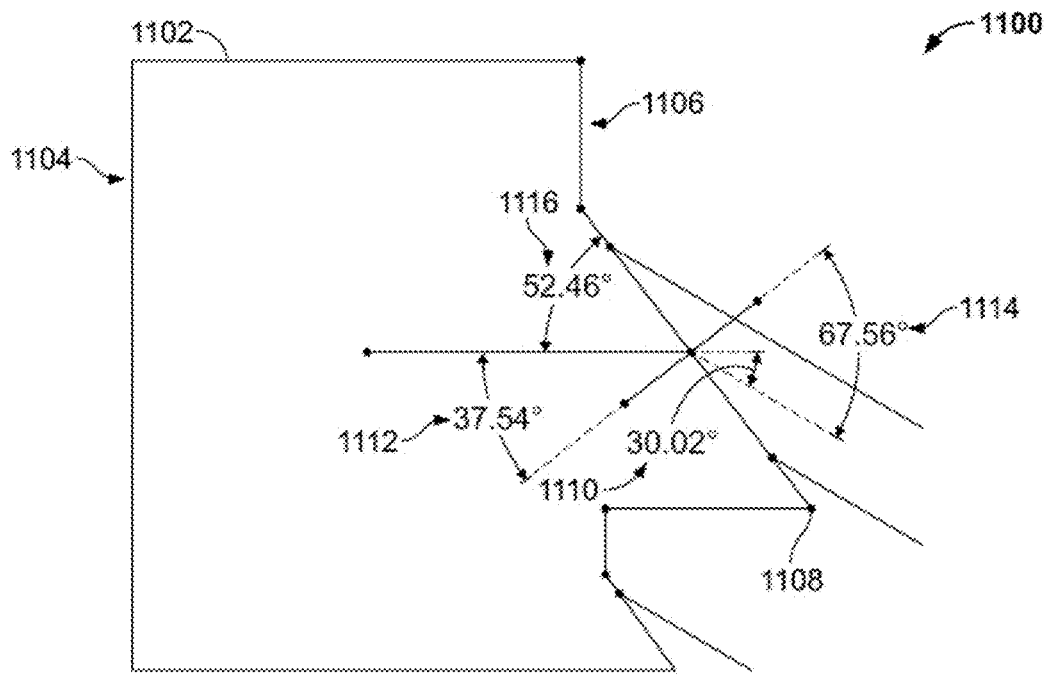
FIG. 11 is a further diagram of an implementation of a diffractive optical elements for geometric intrinsic camera calibration.

Referring now to FIG. 11, illustrated is a diagram 1100 of an implementation of a diffractive optical element 1102 (which, for example, may be the same as, or similar to, diffractive optical element 708 or any other diffractive optical element(s) described herein). Diffractive optical element 1102 includes a first surface 1104 (which, for example, may be the same as, or similar to, first surface 718 and/or 804) and a second surface 1106 (which, for example, may be the same as, or similar to, second surface 720 and/or 806). FIG. 11 includes a partial cross-sectional view of a single ridge 1108 of diffractive optical element 1102 having a ridge angle 1116 (also referred to as a DOE surface angle), a view angle 1110, a theta1 1112, and a theta2 1114. In some embodiments, diffractive optical element 1102 includes multiple (e.g., 15) view angles, and multiple (e.g., 15) corresponding ridges (e.g., similar to ridge 1108). In such embodiments, the geometry (e.g., angles) of each ridge is determined based on Snell's law, a refractive index of material forming the diffractive optical element, and/or other factors, to achieve a desired field angle projection into a camera lens to be calibrated. For instance, the ridge angles (e.g., ridge angle 1116), in some examples are determined by identifying the ridge angles configured to deflect collimated beams from a collimator toward a camera-under-test at particular view angles (e.g., view angles 1110). According to one example, Snell's law (reproduced herein as Equation (1)) and Equation (2) are utilized in an iterative manner, determining values of theta2 (1114) based on successively inputted estimates of theta1 (1112) until values of theta1 and theta2 that result in the desired view angle (1110) are determined.

$$N1 \times \sin(\text{theta1}) = N2 \times \sin(\text{theta2}) \quad \text{Equation (1)}$$

$$\text{view angle} = \text{theta2} - (90° - \text{theta1}) \quad \text{Equation (2)}$$

Once the values of theta1 and theta2 that result in the desired view angle (1110) are determined, the respective ridge angle (1116) for the desired view angle is determined according to Equation (3).

$$\text{ridge angle} = 90° - \text{theta1} \quad \text{Equation (3)}$$

Table 1118 shows an example list of view angles 1110, corresponding values of N1 and N2 (refractive indices of material forming diffractive optical element 1102 and a vacuum, respectively), and values of theta1 1112, theta2 1114, and ridge angles 1116 that may be determined for an example diffractive optical element 1102 having 15 view angles.

Figure 12:
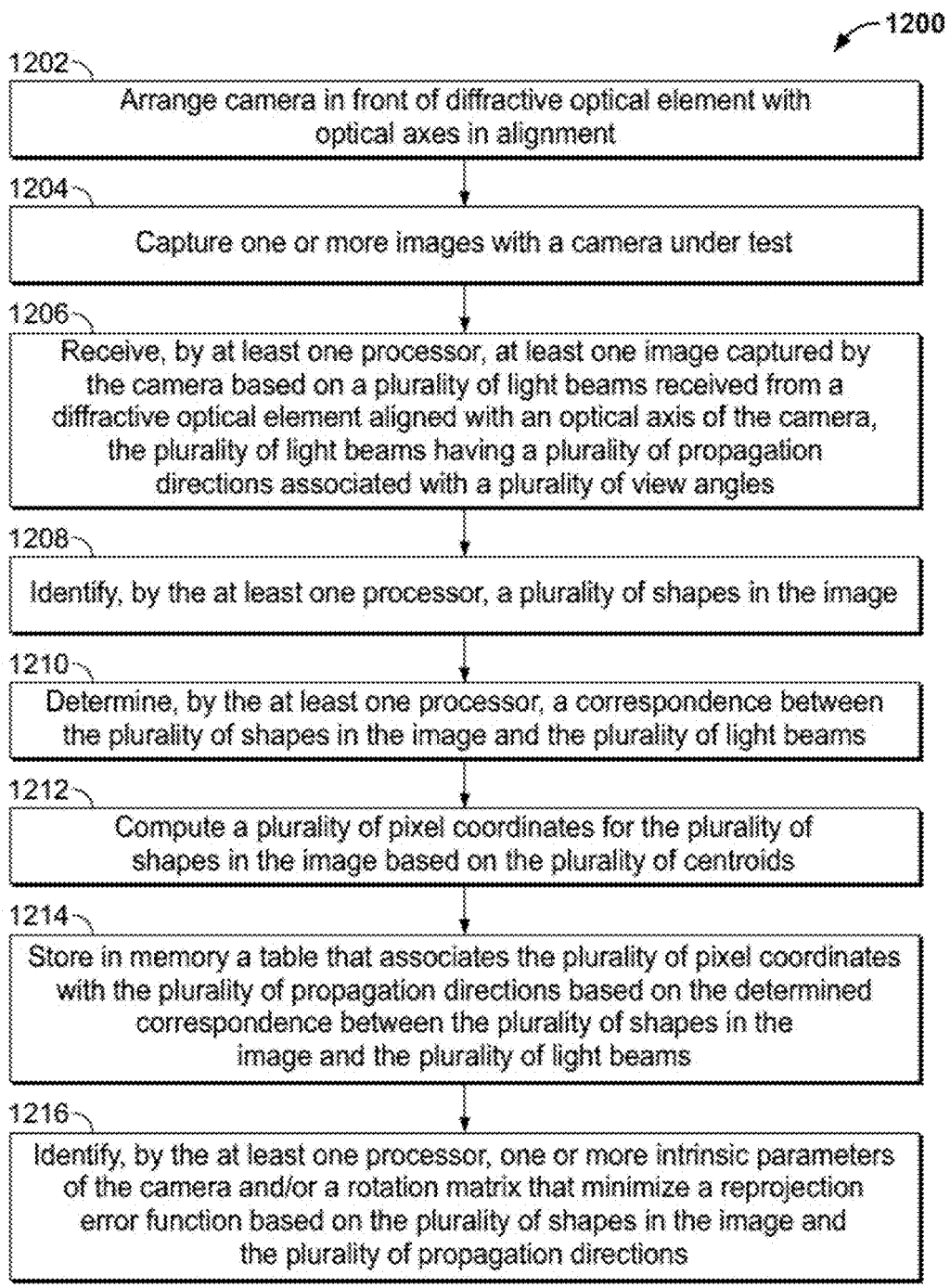
FIG. 12 is a flowchart of a process for geometric intrinsic camera calibration using a diffractive optical element.

Referring now to FIG. 12, illustrated is a flowchart of a process 1200 for geometric intrinsic camera calibration using a diffractive optical element. In some embodiments, one or more of the steps described with respect to process 1200 are performed (e.g., completely, partially, and/or the like) by autonomous vehicle 102, as above. Additionally or alternatively, in some embodiments one or more steps described with respect to process 1200 may be performed (e.g., completely, partially, and/or the like) by another device or group of devices separate from or including autonomous vehicle 102, such as a remote server (e.g., a remote server that is the same as or similar to remote AV system 114 and/or fleet management system 116 of FIG. 1) carrying out some or all of the above calculations.

With continued reference to FIG. 12, a camera (e.g., camera 202a) is arranged in front of a diffractive optical element (which, for example, may be the same as, or similar to, diffractive optical element 708 or any other diffractive optical element(s) described herein) with mutual alignment of optical axes (block 1202). Light beams are projected upon the camera via the diffractive optical element in the manner described elsewhere herein, and the camera captures one or more images based on the projected light beams (block 1204). Processor 608 (or any suitable processor) receives at least one image captured by the camera based on the light beams received from the diffractive optical element aligned with the optical axis of the camera, the light beams having propagation directions associated with view angles of the camera (block 1206). In an example, the directions of the light beams include coordinates in a coordinate frame of the diffractive optical element. Processor 608 identifies shapes in the image, for example, in the manner described in further detail below in connection with FIG. 13 (block 1208). Processor 608 determines a correspondence between the shapes in the image and the light beams, for example, in the manner described in further detail below in connection with FIG. 13. In one example, determining the correspondence between the shapes in the image and the light beams includes generating a list (e.g., pU1, DA1), (pU2, DA2), . . . , (pUN, DAN) where the pUi represent pixel coordinates of dots in the image, and DAi represent corresponding directions of the light beams in DOE-centric coordinates. (block 1210). The pixel coordinates of the dots in the image, for example, may be computed based on a centroid detection algorithm. (block 1212). Processor 608 stores in memory (e.g., memory 612) a table that associates the pixel coordinates with the propagation directions based on the determined correspondence between the shapes in the image and the light beams. (block 1214). Processor 608 identifies one or more intrinsic parameters of the camera (e.g., a focal length of the camera, a principal point of the camera, and/or a distortion of a lens of the camera) that minimize a reprojection error function based on the shapes in the image and the propagation directions (e.g., finding intrinsic parameters (θ) and the rotation matrix CRD that minimize a reprojection error function, such as the sum-of-squares reprojection error function shown in equation (4)) where ||•|| represents the 2-norm) (block 1216).

$$Q(\Theta, {}_CR_D) = \sum_{i=1}^{N}\|{}_pU_i - f({}_CR_D \cdot {}_DA_i, \Theta)\|^2 \qquad \text{Equation (4)}$$

Figure 13:
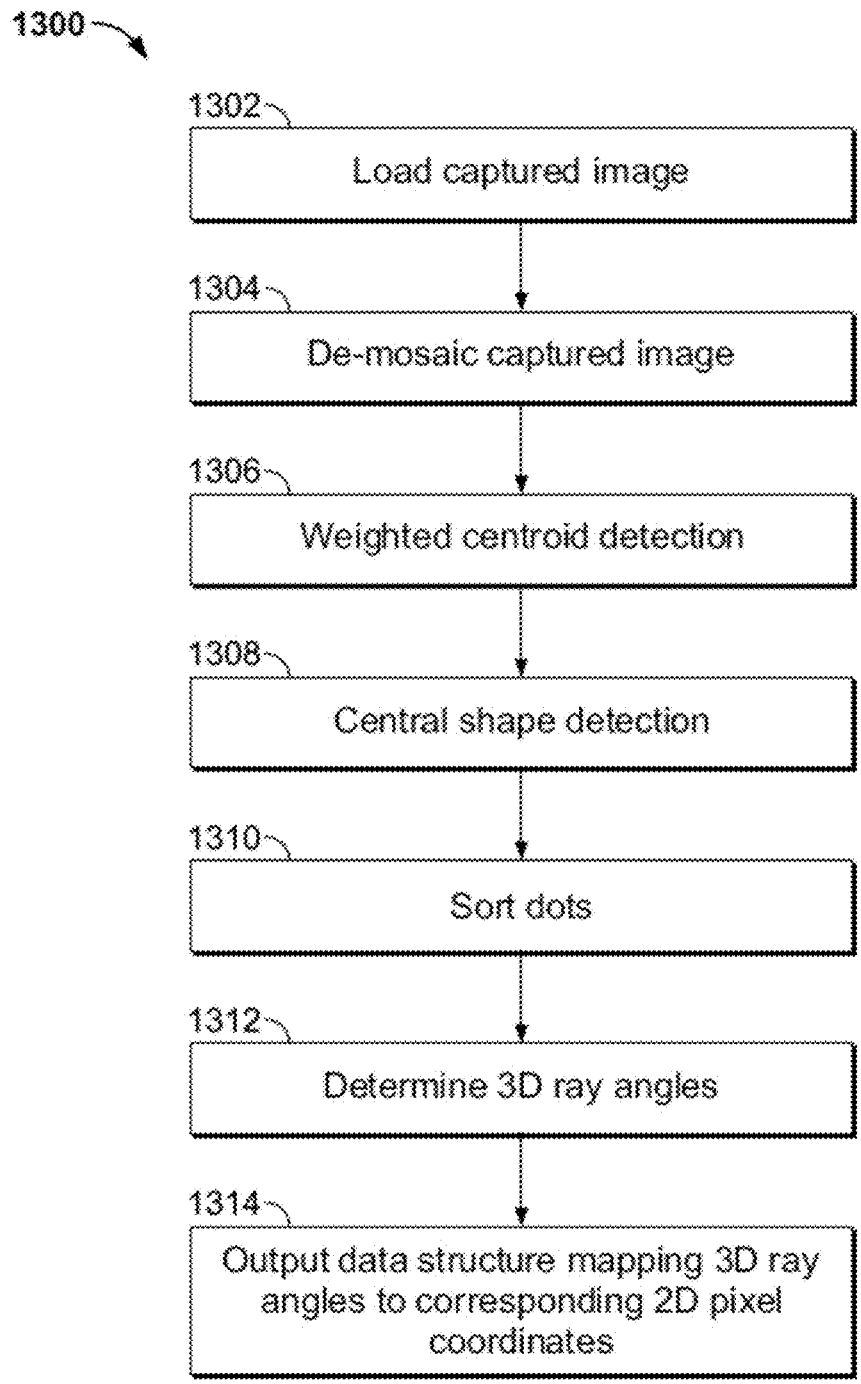
FIG. 13 is a flowchart of a further process for geometric intrinsic camera calibration using a diffractive optical element.

Referring now to FIG. 13, illustrated is a flowchart of a further process 1300 for geometric intrinsic camera calibration using a diffractive optical element. In some embodiments, process 1300 is the same as or similar to the processes of blocks 1208, 1210, and/or 1212 described above in connection with FIG. 12. In some embodiments, one or more of the steps described with respect to process 1300 are performed (e.g., completely, partially, and/or the like) by autonomous vehicle 102, as above. Additionally or alternatively, in some embodiments one or more steps described with respect to process 1300 may be performed (e.g., completely, partially, and/or the like) by another device or group of devices separate from or including autonomous vehicle 102, such as processor 608, a remote server (e.g., a remote server that is the same as or similar to remote AV system 114 and/or fleet management system 116 of FIG. 1) carrying out some or all of the above calculations.

Figure 14:
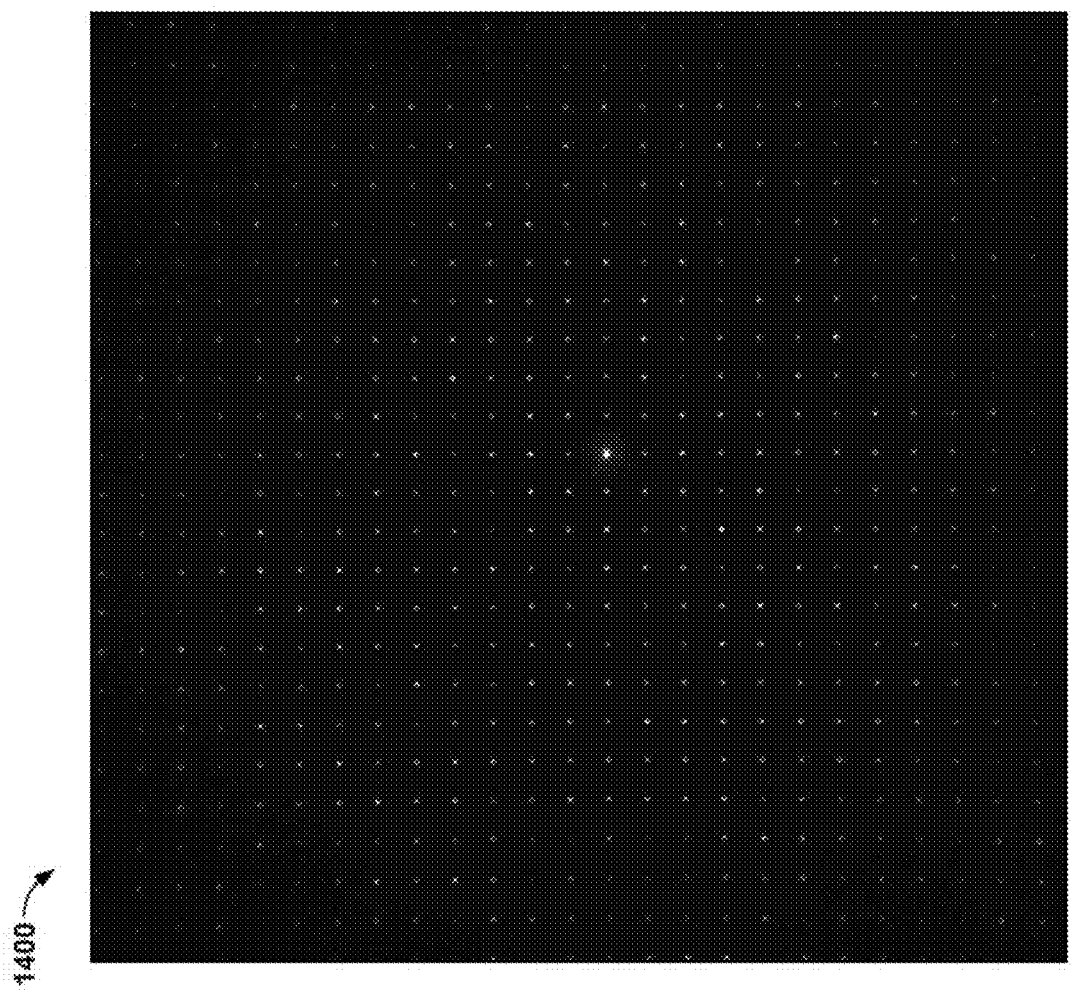
FIG. 14 is a diagram showing an example image captured as part of a process for geometric intrinsic camera calibration using a diffractive optical element.
Figure 15:
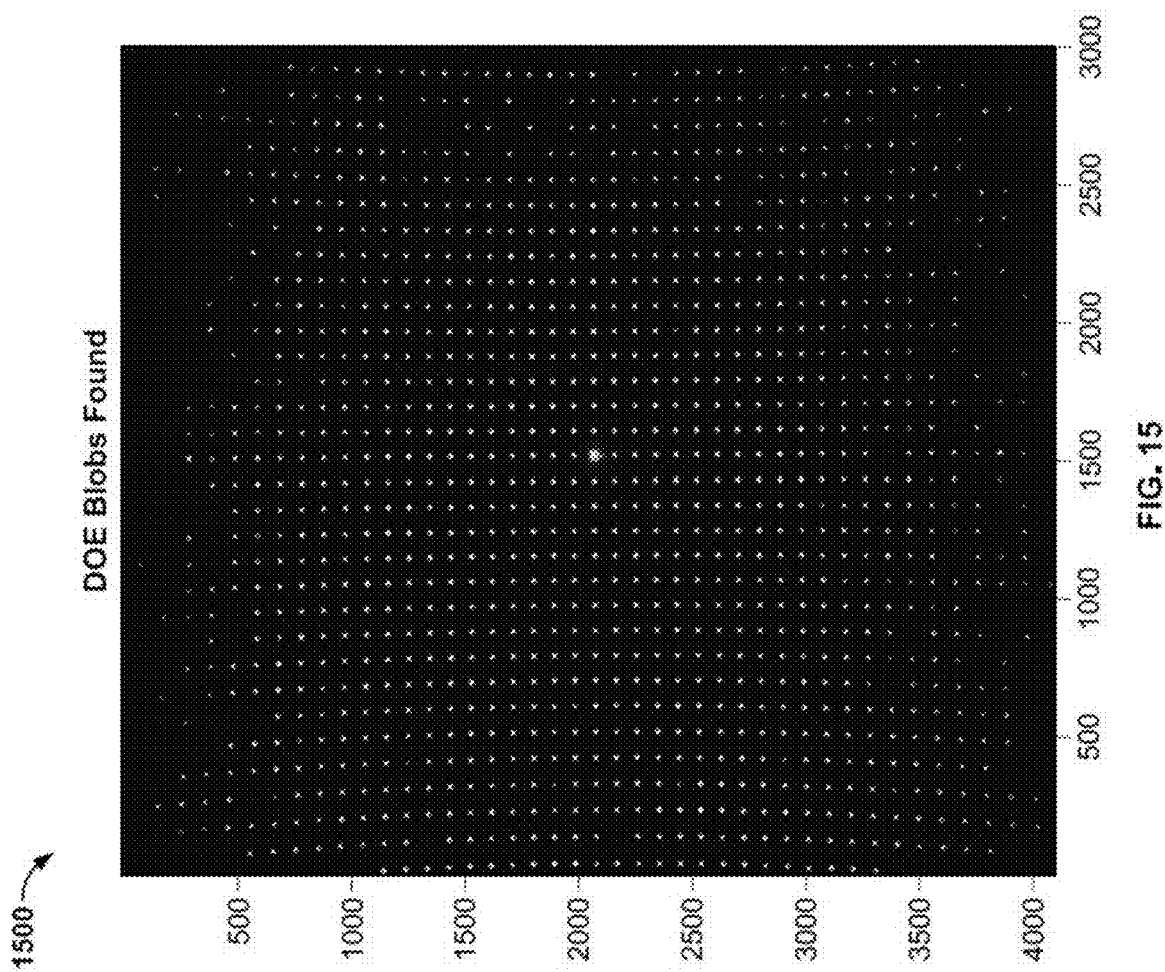
FIG. 15 is a diagram showing shapes identified in the sample image of FIG. 14 as part of a process for geometric intrinsic camera calibration using a diffractive optical element.
Figure 16:
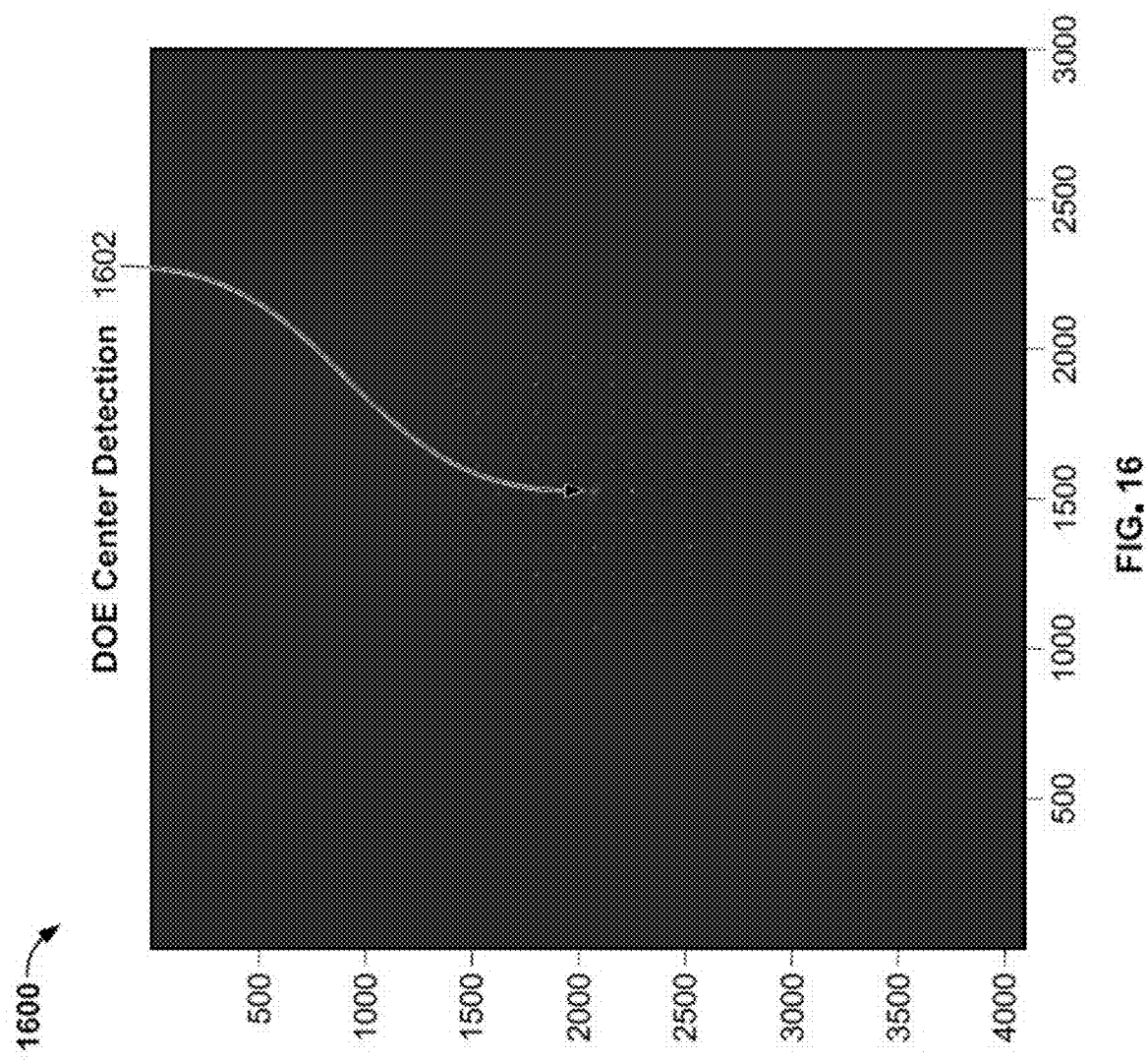
FIG. 16 is a diagram showing a central shape identified in the image of FIG. 15 as part of a process for geometric intrinsic camera calibration using a diffractive optical element.
Figure 17:
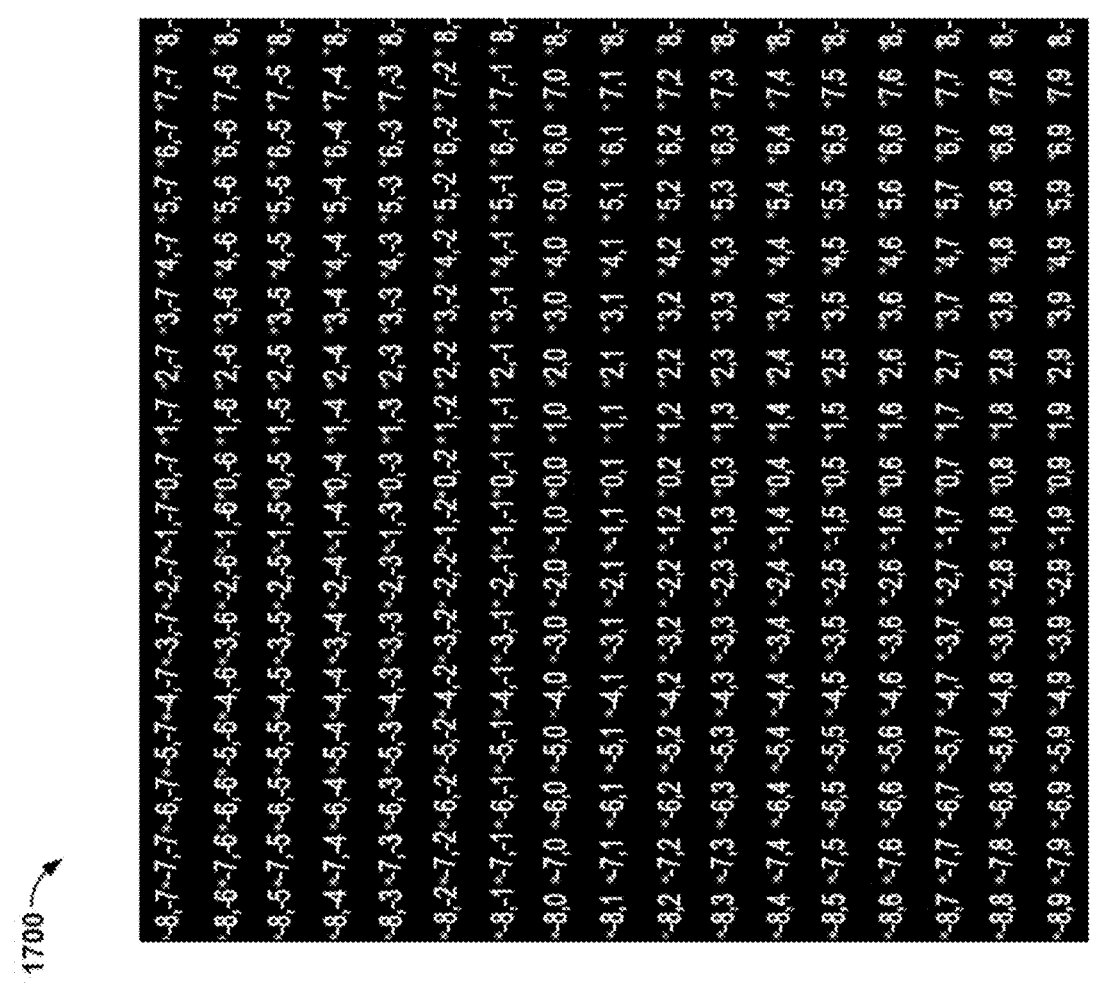

With continued reference to FIG. 13, processor 608 (or any suitable processor) loads an image, such as the image 1400 in FIG. 14 that was captured by a camera (e.g., camera 202a) based on light beams projected thereupon by way of a diffractive optical element (which, for example, may be the same as, or similar to, diffractive optical element 708 or any other diffractive optical element(s) described herein) (1302). Processor 608 de-mosaics the loaded image using any suitable de-mosaic algorithm (1304). Processor 608 identifies shapes (e.g., blobs, dots, and/or centroids as shown in image 1500 of FIG. 15) in the de-mosaiced image by executing a weighted centroid detection algorithm based on the de-mosaiced image (1306). Processor 608 designates one of the identified shapes (e.g., shape 1602 of FIG. 16) as corresponding to a central shape 1602 from among the shapes in image 1500 (1308). Processor 608 sorts the shapes of image 1500 into an order (e.g., in the row and column order indexed based on the central shape 1602 shown in FIG. 17) based at least in part on positions of the plurality of shapes with respect to the central shape 1602 (1310). Processor 608 associates each shape with a corresponding light beam from among the light beams based at least in part on the order of the shapes (1312).

As described above with reference to FIGS. 6-17, a DOE-collimator intrinsic calibration module can be utilized for intrinsic calibration (determining, among other things, the principal point of a camera system). As will be further described herein, such a DOE-collimator intrinsic calibration module can be incorporated into an active alignment process to minimize decentration and improve the overall quality of a camera system.

Figure 18:
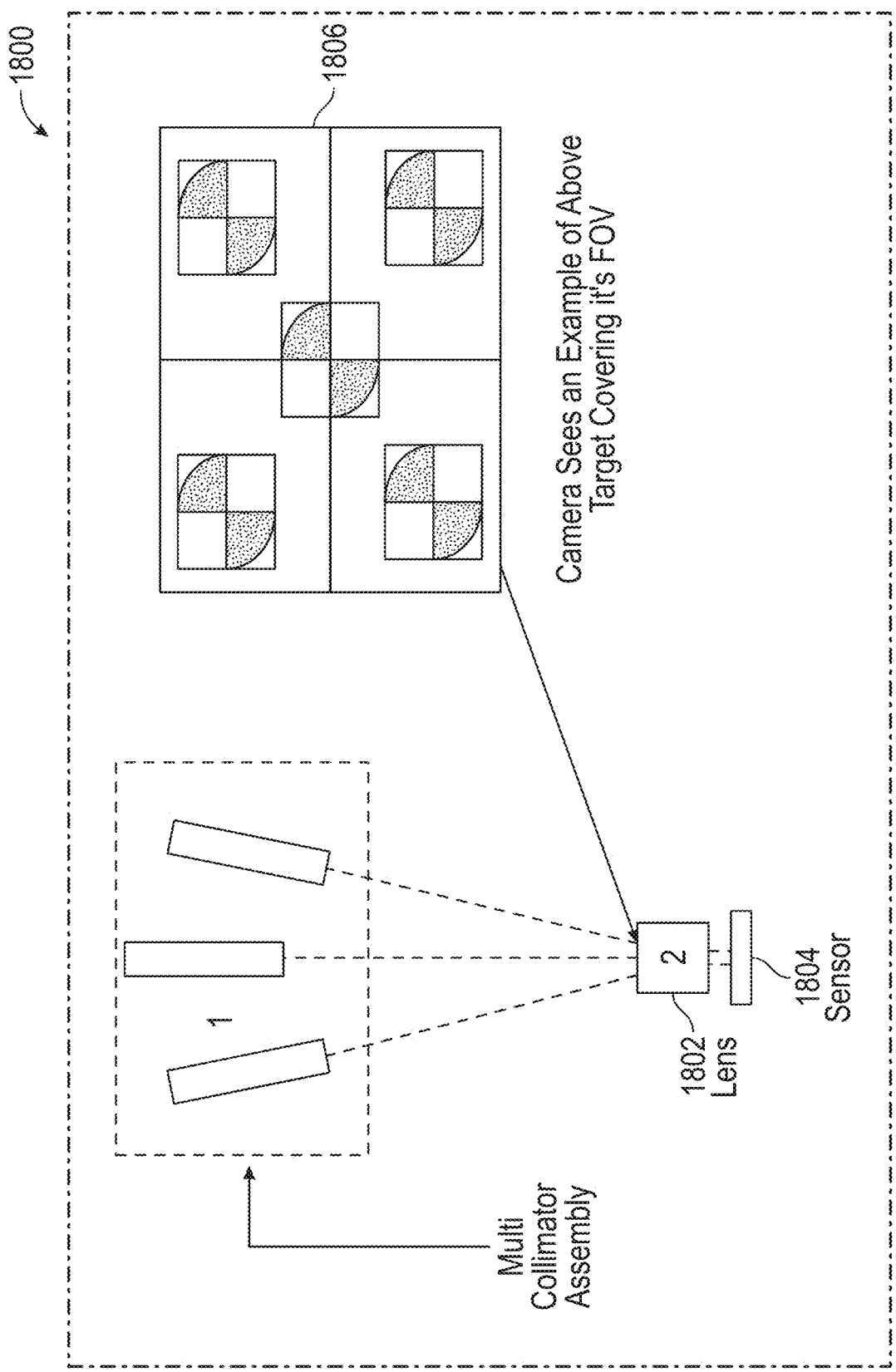
FIG. 18 illustrates an embodiment of a multi-collimator assembly that can be used during an active alignment with intrinsic calibration process.
Figure 19:
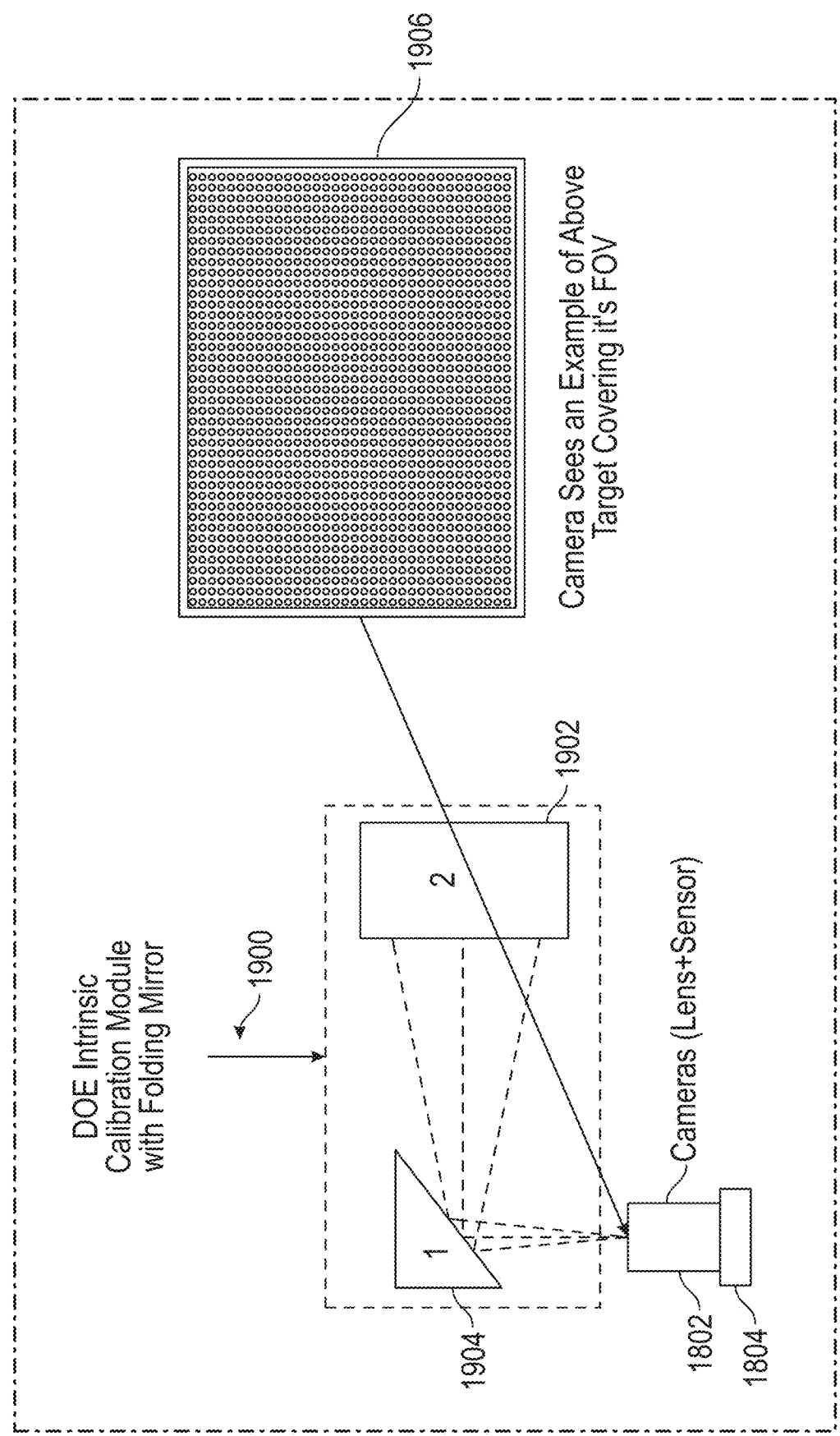
FIG. 19 illustrates an embodiment of a diffractive optical element (DOE) intrinsic calibration module that can be used during an active alignment with intrinsic calibration process.

An active alignment system with intrinsic calibration as described herein can include two modules: a multi-collimator assembly 1800 (for example, as shown in FIG. 18) and a DOE intrinsic calibration module 1900 (e.g., as shown in FIG. 19). Other components can be included as well, such as stages on which a lens and image sensor of a camera assembly can be positioned and manipulated.

With reference first to FIG. 18, the multi-collimator assembly can include a plurality of collimators that are configured to project a plurality of targets 1806 through a lens 1802 and onto an image sensor 1804. In some embodiments, at least nine collimators are used, one for the center of the image and four additional at each of 0.5 F and 0.85 F field positions. Other numbers and positions can also be used. The lens 1802 can be mounted in or on a stage, such as a stage that is configured to manipulate the position of the lens 1802 in three-dimensional space. The image sensor 1804 can also be positioned on a stage that can be configured to manipulate the position of the image sensor 1804 in three-dimensional space. By manipulating the positions of the lens 1802 and/or the image sensor 1084, the alignment between the two can be adjusted. The multi-collimator assembly 1800 projects the targets 1804 through the lens 1802 and onto the image sensor such that an image of the targets 1086 can be captured by the image sensor. In some embodiments, the targets 1806 comprise modulation transfer function (MTF) targets (for example, as illustrated). Other types of targets can be used as well.

With reference to FIG. 19, an example DOE intrinsic calibration module 1900 is illustrated. In the illustrated embodiment, the DOE intrinsic calibration module includes device 1902 that includes a diffractive optical element (e.g., a device similar to that described above with reference to FIGS. 6-17). The device can be configured to split a beam of light to project at pre-defined field points on to the target plane (e.g., onto the image sensor). The DOE intrinsic calibration module 1900 can also include an angled reflective surface 1904. The surface 1904 is configured to redirect the light source (e.g., the grid of points 1906) from the device 1902 through the lens 1802 and onto the image sensor 1804. In some embodiments, the reflective surface 1904 comprises a glass block with reflective surface at 45 degrees, although other materials and angles are possible. In some instances, the purpose of the surface 1904 is project the light source (e.g., the grid point target 1906) onto the camera assembly (e.g., the lens 1802 and the image sensor 1804).

The angle of the reflective surface 1904 is based on the relative position of camera assembly to the device 1902 (e.g., at one half the of total angle difference). As will be described in more detail below with reference to FIGS. 20A-20C, the DOE intrinsic calibration module 1900 can be configured such that it is movable between a position that is not between the multi-collimator assembly 1800 and the camera assembly to a position that is between the multi-collimator assembly 1800 and the camera assembly. In this way, the DOE intrinsic calibration module 1900 can be incorporated into the active alignment assembly. In some embodiments, the reflective surface 1904 can be eliminated and the device 1902 can project directly onto the image sensor 1804.

Figure 20A:
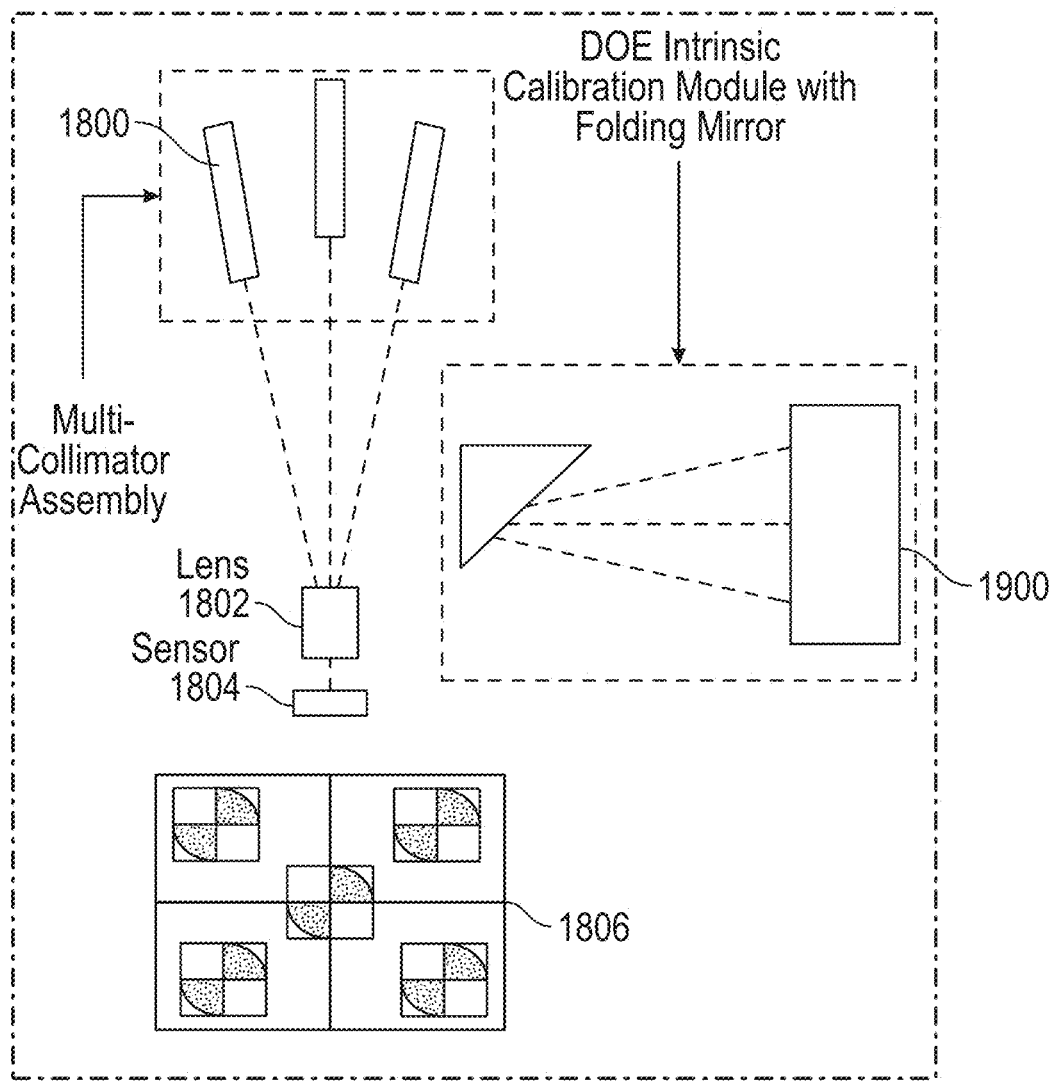
FIG. 20A illustrates an example of a first stage during an active alignment with intrinsic calibration process.
Figure 20B:
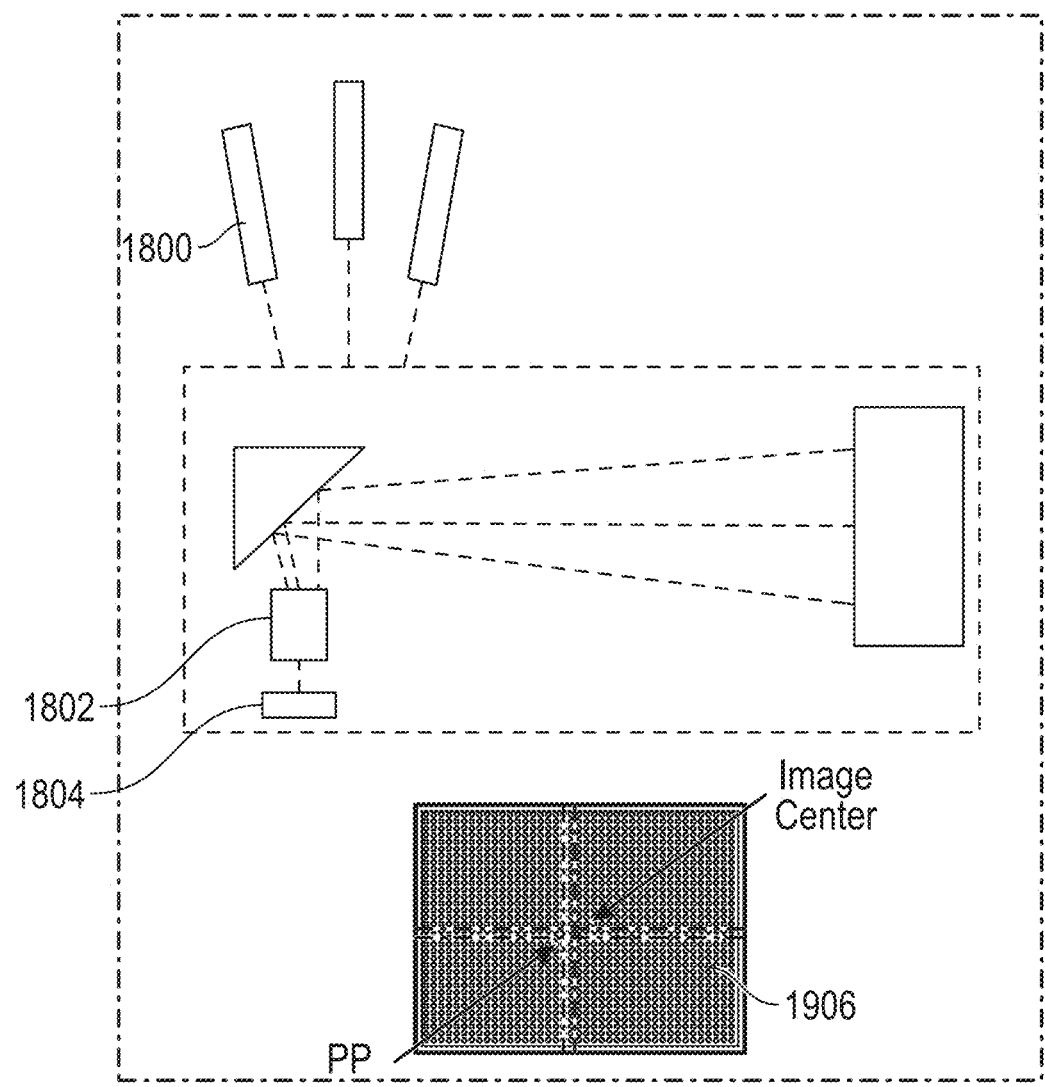
FIG. 20B illustrates an example of a second stage during an active alignment with intrinsic calibration process.
Figure 20C:
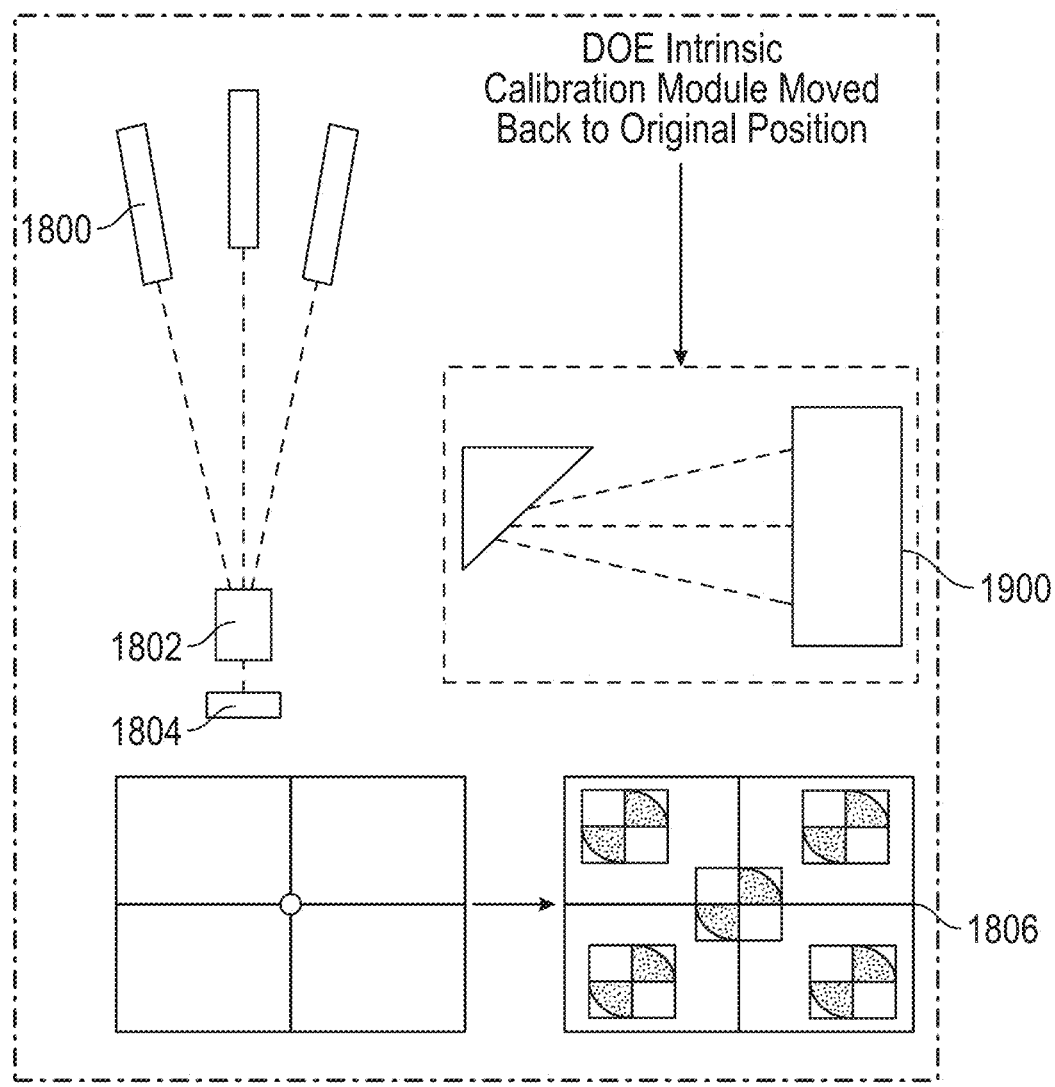
FIG. 20C illustrates an example of a third stage during an active alignment with intrinsic calibration process.

FIGS. 20A-20C illustrate the alignment system with intrinsic calibration during use. Beginning with FIG. 20A, at a first stage in the process, the multi-collimator assembly 1800 projects the target 1806 through the lens 1802 and onto the image sensor 1804. As noted above, the lens 1802 and onto the image sensor 1804 can be positioned on multi-axis stages such that they can be aligned with respect to their respective optical centers. At this stage, the DOE intrinsic calibration module 1900 is moved out of the optical path. In this position, a first active alignment of the lens 1802 and the image sensor 1804 can be performed based on an image of the targets 1806. This can involve moving one or both of the lens 1802 and image sensor 1804 using the multi-axis stages.

With reference to FIG. 20B, at a second stage, the DOE intrinsic calibration module 1900 can be moved into the optical path of the camera assembly (e.g., the lens 1802 and the image sensor 1804). For example, as illustrated, the DOE intrinsic calibration module 1900 can be moved between the multi-collimator assembly and the camera assembly. In this position, DOE intrinsic calibration module 1900 projects the grid point target 1906 onto the image sensor (as reflected by the reflective surface 1904). As described above, an intrinsic calibration process can be performed to determine, among other things the principal point of the camera assembly. As shown in FIG. 20B, due to misalignment, the principal point and the image sensor may not be aligned.

With reference to FIG. 20C, next, the DOE intrinsic calibration module 1900 can be moved out of the optical path. This can allow the multi-collimator assembly 1800 to once again project its targets 1806 onto the image sensor 1804. In this position, a second active alignment can be performed to align the image center of the image sensor 1804 with the principal point of the camera assembly determined previously. Simultaneously, alignment can occur to optimize the MTF. As before, the alignment can be achieved by moving by one or both of the lens 1802 and image sensor 1804 using their associated stages. This can be an iterative process: after intrinsic calibration, MTF optimization can begin. After MTF optimization, the intrinsic calibration can be repeated again. This can be repeated until the principle point location before and after MTF optimization cycle becomes negligible or within a centering accuracy requirement. In some embodiments, this can be accomplished in less than five iterations depending on the precision of the centering requirements. Once aligned, an adhesive can be used to fix the relative positions of the lens 1802 and the image sensor 1804. This can result in a camera assembly in which the lens 1802 and the image sensor 1804 have improved alignment and performance.

Figure 21:
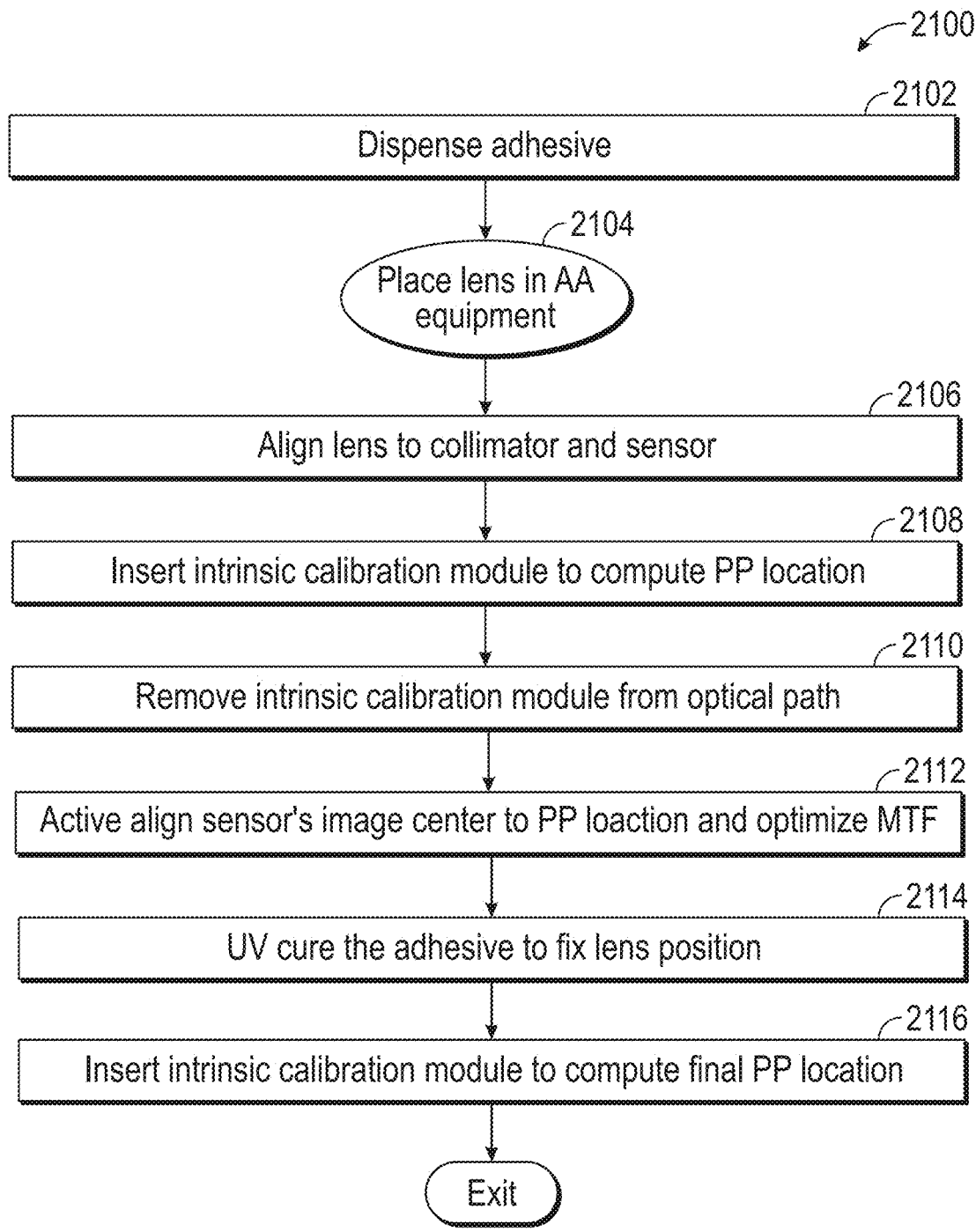
FIG. 21 is a flowchart showing an example process for active alignment with intrinsic calibration.

FIG. 21 provides an example of an active alignment process with intrinsic calibration (process 2100). In the illustrated example, the process 2100 begins at block 2102 at which an adhesive is dispensed onto the lens and/or the image sensor. At block 2104, the lens and the image sensor can be positioned on their respective stages. As noted above, the stages can be multi-axis stages that allow for adjustment of the relative positions of the lens and the image sensor. At block 2016, the lens and sensor are aligned (e.g., a first active alignment) using the multi-collimator assembly (FIG. 20A). At block 2108, the DOE intrinsic calibration module can be moved into position and used to compute the principal point location, among other intrinsic parameters of the camera assembly. An example is shown in FIG. 20B, with additional detail regarding the intrinsic calibration process described above with reference to FIGS. 6-17. At block 2110, the DOE intrinsic calibration module is removed from the optical path of the camera, for example, to a position as shown in FIG. 20C. At block 2112, a second active alignment aligns the image sensor's image center with the determined principal point and optimizes MTF. At block 2114, with the image sensor and lens now aligned, the adhesive can be cured (e.g., using ultraviolet light), fixing the lens and image sensor in place. In some embodiments, at block 2116, the DOE intrinsic calibration module can then be reinserted into the optical path and a final intrinsic calibration of the assembled camera assembly can be performed. Parameters determined during the intrinsic calibration can be stored for future use.

Figure 22:
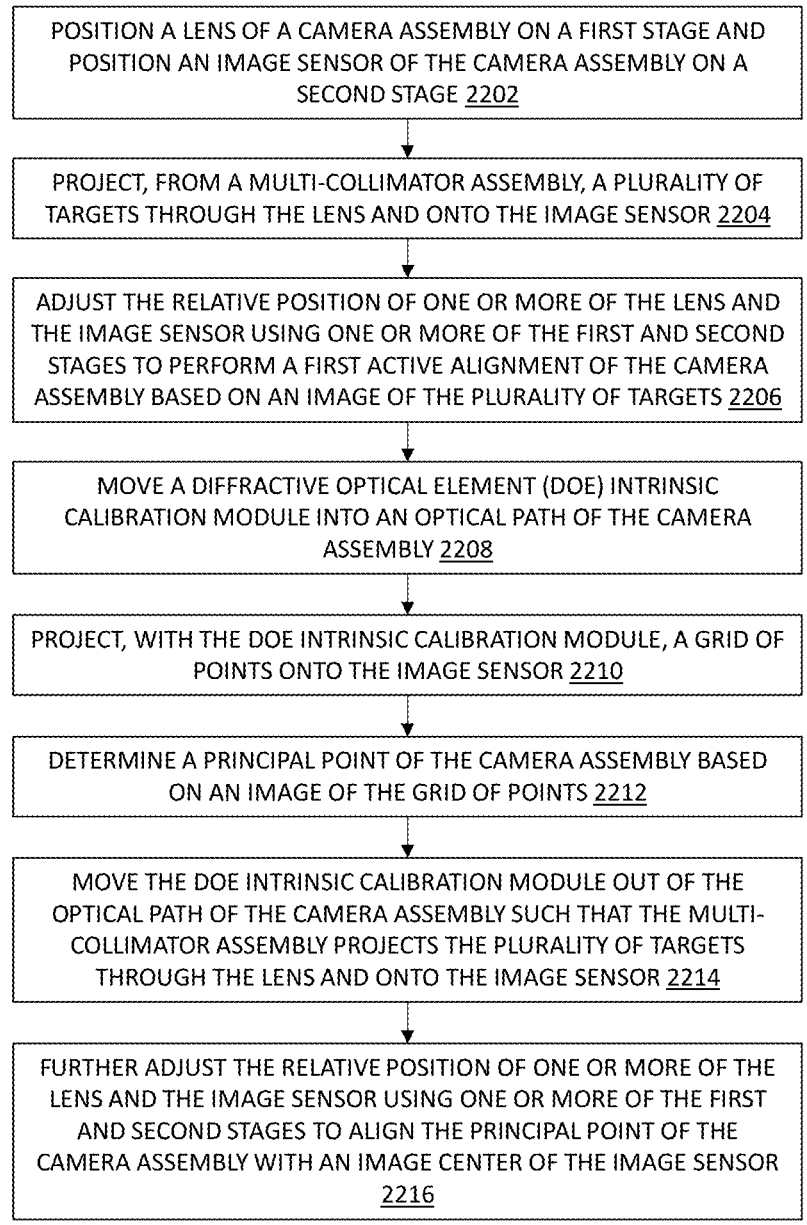
FIG. 22 is a flowchart showing another example process for active alignment with intrinsic calibration.

FIG. 22 provides another example of an active alignment process with intrinsic calibration (process 2200). In this example, the method begins at block 2202, which includes positioning a lens of a camera assembly on a first stage and positioning an image sensor of the camera assembly on a second stage. In some embodiments, one or more of the first and second stages are configured to adjust a relative position of the lens and the image sensor as described above. At block 2204, a multi-collimator assembly projects a plurality of targets through the lens and onto the image sensor such that the plurality of targets is visible in a first image captured by the image sensor (e.g., as shown in FIG. 20A). At block 2206, the relative position of one or more of the lens and the image sensor can be adjusted using one or more of the first and second stages to perform a first active alignment of the camera assembly based on the first image captured. At block 2208, a diffractive optical element (DOE) intrinsic calibration module is moved into an optical path of the camera assembly (e.g., as shown in FIG. 20B). As described previously the DOE intrinsic calibration module is configured to, at block 2210, project a grid of points onto the image sensor such that the grid of points is visible in a second image captured by the image sensor. At block 2212, a principal point of the camera assembly can be determined based on the second image. This can be accomplished, for example, using the intrinsic calibration metrology described above with reference to FIGS. 6-17. At block 2214, the DOE intrinsic calibration module is then moved out of the optical path of the camera assembly such that the multi-collimator assembly projects the plurality of targets through the lens and onto the image sensor such that the plurality of targets is visible in a third image captured by the image sensor. At block 2216, the relative position of one or more of the lens and the image sensor using one or more of the first and second stages to align the principal point of the camera assembly with an image center of the image sensor and to perform a second active alignment based on the third image.

In some embodiments, the process can also include dispensing an adhesive between the lens and the image sensor prior to performing the first active alignment and curing the adhesive subsequent to performing the second active alignment.

In some embodiments, the process can also include moving the DOE intrinsic calibration module back into the optical path of the camera assembly, such that the DOE intrinsic calibration module projects a grid of points onto the image sensor, wherein the grid of points is visible in a fourth image captured by the image sensor, and determining a final principal point of the camera assembly based on the fourth image.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Various additional example embodiments of the disclosure can be described by the following clauses:

Clause 1: A method, comprising:
  positioning, using at least one processor, a lens of a camera assembly on a first stage and positioning an image sensor of the camera assembly on a second stage, wherein one or more of the first and second stages are configured to adjust a relative position of the lens and the image sensor;
  projecting, using the at least one processor, from a multi-collimator assembly, a plurality of targets through the lens and onto the image sensor such that the plurality of targets is visible in a first image captured by the image sensor;
  adjusting using the at least one processor, the relative position of one or more of the lens and the image sensor using one or more of the first and second stages to perform a first active alignment of the camera assembly based on the first image captured;
  moving using the at least one processor, a diffractive optical element (DOE) intrinsic calibration module into an optical path of the camera assembly, wherein the DOE intrinsic calibration module is configured to project a grid of points onto the image sensor such that the grid of points is visible in a second image captured by the image sensor;
  determining using the at least one processor, a principal point of the camera assembly based on the second image;
  moving, using the at least one processor, the DOE intrinsic calibration module out of the optical path of the camera assembly such that the multi-collimator assembly projects the plurality of targets through the lens and onto the image sensor such that the plurality of targets is visible in a third image captured by the image sensor; and
  further adjusting, using the at least one processor, the relative position of one or more of the lens and the image sensor using one or more of the first and second stages to align the principal point of the camera assembly with an image center of the image sensor and to perform a second active alignment based on the third image.

Clause 2: The method of Clause 1, further comprising dispensing an adhesive between the lens and the image sensor prior to performing the first active alignment.

Clause 3: The method of Clause 2, further comprising curing the adhesive subsequent to performing the second active alignment.

Clause 4: The method according to any of the preceding clauses, further comprising:
  moving the DOE intrinsic calibration module into the optical path of the camera assembly, such that the DOE intrinsic calibration module projects a grid of points onto the image sensor, wherein the grid of points is visible in a fourth image captured by the image sensor; and
  determining a final principal point of the camera assembly based on the fourth image.

Clause 5: The method according to any of the preceding clauses, wherein the DOE intrinsic calibration module comprises:
  a light source, a collimator, and a diffractive optical element configured to project a grid of points along a first axis; and
  a reflective surface positioned along the first axis and configured to reflect the grid of points along a second axis different than the first.

Clause 6: The method of Clause 5, wherein the first axis and the second axis are orthogonal.

Clause 7: The method according to any of the preceding clauses, wherein the plurality of targets comprises a plurality of modular transfer function (MTF) targets.

Clause 8: The method according to any of the preceding clauses, wherein adjusting the relative position of one or more of the lens and the image sensor using one or more of the first and second stages comprises adjusting a position of one or more of the first and second stages.

Clause 9: A system comprising:
  a first stage configured to receive a lens of a camera assembly and a second stage configured to receive an image sensor of the camera assembly, wherein one or more of the first and second stages are configured to adjust a relative position of the lens and the image sensor;
  a multi-collimator assembly configured to project a plurality of targets along an optical axis of the camera assembly; and
  a moveable diffractive optical element (DOE) intrinsic calibration module comprising a light source, a collimator, and a diffractive optical element configured to project a grid of points, wherein a position of the moveable DOE intrinsic calibration module is movable between:
  a first position, wherein the DOE intrinsic calibration module is positioned outside of the optical axis, and
  a second position, wherein the DOE intrinsic calibration module is positioned on the optical axis;
  at least one processor, and
  at least one non-transitory storage media storing instructions that, when executed by the at least one processor, cause the at least one processor to:
    cause the one or more of the first and second stages are configured to adjust a relative position of the lens and the image sensor;
    project the plurality of targets with the multi-collimator assembly;

move the DOE intrinsic calibration module between the first and second positions and project the grid of points.

Clause 10: The system according to Clause 9, wherein the DOE intrinsic calibration module is configured to project a grid of points along a first axis; and further comprises a reflective surface positioned along the first axis and configured to reflect the grid of points along a second axis different than the first.

Clause 11: The system of Clause 10, wherein the first axis and the second axis are orthogonal.

Clause 12: The system according to any Clauses 9-11, wherein the plurality of targets comprises a plurality of modular transfer function (MTF) targets.

Clause 13: The system according to any Clauses 9-12, wherein a position of one or more of the first and second stages is remotely controllable.

Clause 14: At least one non-transitory storage media storing instructions that, when executed by at least one processor, cause the at least one processor to:
cause a multi-collimator assembly to project a plurality of targets through a lens of a camera assembly and onto an image sensor of the camera assembly such that the plurality of targets is visible in a first image captured by the image sensor, wherein the lens is positioned on a first stage and the image sensor is positioned on a second stage, and wherein one or more of the first and second stages are configured to adjust a relative position of the lens and the image sensor;
adjust the relative position of one or more of the lens and the image sensor using one or more of the first and second stages to perform a first active alignment of the camera assembly based on the first image captured;
cause a diffractive optical element (DOE) intrinsic calibration module to move into an optical path of the camera assembly, wherein the DOE intrinsic calibration module is configured to project a grid of points onto the image sensor such that the grid of points is visible in a second image captured by the image sensor;
determine a principal point of the camera assembly based on the second image;
cause the DOE intrinsic calibration module to move out of the optical path of the camera assembly such that the multi-collimator assembly projects the plurality of targets through the lens and onto the image sensor such that the plurality of targets is visible in a third image captured by the image sensor; and
cause further adjustment of the relative position of one or more of the lens and the image sensor using one or more of the first and second stages to align the principal point of the camera assembly with an image center of the image sensor and to perform a second active alignment based on the third image.

Clause 15: The at least one non-transitory storage media of Clause 14, wherein the instructions further cause the at least one processor to cause dispensing of an adhesive between the lens and the image sensor prior to performing the first active alignment.

Clause 16: The at least one non-transitory storage media of Clause 15, wherein the instructions further cause the at least one processor to cause curing of the adhesive subsequent to performing the second active alignment.

Clause 17: The at least one non-transitory storage media of any of Clauses 14-16, wherein the instructions further cause the at least one processor to move the DOE intrinsic calibration module into the optical path of the camera assembly, such that the DOE intrinsic calibration module projects a grid of points onto the image sensor, wherein the grid of points is visible in a fourth image captured by the image sensor.

Clause 18: The at least one non-transitory storage media of Clause 18, wherein the instructions further cause the at least one processor to determine a final principal point of the camera assembly based on the fourth image.

Clause 19: The at least one non-transitory storage media according to any of any of Clauses 14-18, wherein the DOE intrinsic calibration module comprises:
a light source, a collimator, and a diffractive optical element configured to project a grid of points along a first axis; and
a reflective surface positioned along the first axis and configured to reflect the grid of points along a second axis different than the first.

The at least one non-transitory storage media of any of the Clauses 14-19, wherein the plurality of targets comprises a plurality of modular transfer function (MTF) targets.

What is claimed is:

1. A method, comprising:
positioning, using at least one processor, a lens of a camera assembly on a first stage and positioning an image sensor of the camera assembly on a second stage, wherein one or more of the first and second stages are configured to adjust a relative position of the lens and the image sensor;
projecting, using the at least one processor, from a multi-collimator assembly, a plurality of targets through the lens and onto the image sensor such that the plurality of targets is visible in a first image captured by the image sensor;
adjusting, using the at least one processor, the relative position of one or more of the lens and the image sensor using one or more of the first and second stages to perform a first active alignment of the camera assembly based on the first image captured;
moving, using the at least one processor, a diffractive optical element (DOE) intrinsic calibration module into an optical path of the camera assembly, wherein the DOE intrinsic calibration module is configured to project a grid of points onto the image sensor such that the grid of points is visible in a second image captured by the image sensor;
determining, using the at least one processor, a principal point of the camera assembly based on the second image;
moving, using the at least one processor, the DOE intrinsic calibration module out of the optical path of the camera assembly such that the multi-collimator assembly projects the plurality of targets through the lens and onto the image sensor such that the plurality of targets is visible in a third image captured by the image sensor; and
further adjusting, using the at least one processor, the relative position of one or more of the lens and the image sensor using one or more of the first and second stages to align the principal point of the camera assembly with an image center of the image sensor and to perform a second active alignment based on the third image.

2. The method of claim 1, further comprising dispensing an adhesive between the lens and the image sensor prior to performing the first active alignment.

3. The method of claim 2, further comprising curing the adhesive subsequent to performing the second active alignment.

4. The method of claim 1, further comprising:
moving the DOE intrinsic calibration module into the optical path of the camera assembly, such that the DOE intrinsic calibration module projects a grid of points onto the image sensor, wherein the grid of points is visible in a fourth image captured by the image sensor; and
determining a final principal point of the camera assembly based on the fourth image.

5. The method of claim 1, wherein the DOE intrinsic calibration module comprises:
a light source, a collimator, and a diffractive optical element configured to project a grid of points along a first axis; and
a reflective surface positioned along the first axis and configured to reflect the grid of points along a second axis different than the first.

6. The method of claim 5, wherein the first axis and the second axis are orthogonal.

7. The method of claim 1, wherein the plurality of targets comprises a plurality of modular transfer function (MTF) targets.

8. The method of claim 1, wherein adjusting the relative position of one or more of the lens and the image sensor using one or more of the first and second stages comprises adjusting a position of one or more of the first and second stages.

9. A system comprising:
a first stage configured to receive a lens of a camera assembly and a second stage configured to receive an image sensor of the camera assembly, wherein one or more of the first and second stages are configured to adjust a relative position of the lens and the image sensor;
a multi-collimator assembly configured to project a plurality of targets along an optical axis of the camera assembly;
a moveable diffractive optical element (DOE) intrinsic calibration module comprising a light source, a collimator, and a diffractive optical element configured to project a grid of points, wherein a position of the moveable DOE intrinsic calibration module is movable between:
a first position, wherein the DOE intrinsic calibration module is positioned outside of the optical axis, and
a second position, wherein the DOE intrinsic calibration module is positioned on the optical axis; and
at least one processor, and
at least one non-transitory storage media storing instructions that, when executed by the at least one processor, cause the at least one processor to:
cause the one or more of the first and second stages are configured to adjust a relative position of the lens and the image sensor;
project the plurality of targets with the multi-collimator assembly;
move the DOE intrinsic calibration module between the first and second positions and project the grid of points.

10. The system of claim 9, wherein the DOE intrinsic calibration module is configured to project a grid of points along a first axis; and further comprises a reflective surface positioned along the first axis and configured to reflect the grid of points along a second axis different than the first.

11. The system of claim 10, wherein the first axis and the second axis are orthogonal.

12. The system of claim 9, wherein the plurality of targets comprises a plurality of modular transfer function (MTF) targets.

13. The system of claim 9, wherein a position of one or more of the first and second stages is remotely controllable.

14. At least one non-transitory storage media storing instructions that, when executed by at least one processor, cause the at least one processor to:
cause a multi-collimator assembly to project a plurality of targets through a lens of a camera assembly and onto an image sensor of the camera assembly such that the plurality of targets is visible in a first image captured by the image sensor, wherein the lens is positioned on a first stage and the image sensor is positioned on a second stage, and wherein one or more of the first and second stages are configured to adjust a relative position of the lens and the image sensor;
adjust the relative position of one or more of the lens and the image sensor using one or more of the first and second stages to perform a first active alignment of the camera assembly based on the first image captured;
cause a diffractive optical element (DOE) intrinsic calibration module to move into an optical path of the camera assembly, wherein the DOE intrinsic calibration module is configured to project a grid of points onto the image sensor such that the grid of points is visible in a second image captured by the image sensor;
determine a principal point of the camera assembly based on the second image;
cause the DOE intrinsic calibration module to move out of the optical path of the camera assembly such that the multi-collimator assembly projects the plurality of targets through the lens and onto the image sensor such that the plurality of targets is visible in a third image captured by the image sensor; and
cause further adjustment of the relative position of one or more of the lens and the image sensor using one or more of the first and second stages to align the principal point of the camera assembly with an image center of the image sensor and to perform a second active alignment based on the third image.

15. The at least one non-transitory storage media of claim 14, wherein the instructions further cause the at least one processor to cause dispensing of an adhesive between the lens and the image sensor prior to performing the first active alignment.

16. The at least one non-transitory storage media of claim 15, wherein the instructions further cause the at least one processor to cause curing of the adhesive subsequent to performing the second active alignment.

17. The at least one non-transitory storage media of claim 14, wherein the instructions further cause the at least one processor to move the DOE intrinsic calibration module into the optical path of the camera assembly, such that the DOE intrinsic calibration module projects a grid of points onto the image sensor, wherein the grid of points is visible in a fourth image captured by the image sensor.

18. The at least one non-transitory storage media of claim 17, wherein the instructions further cause the at least one processor to determine a final principal point of the camera assembly based on the fourth image.

19. The at least one non-transitory storage media of claim 14, wherein the DOE intrinsic calibration module comprises:
- a light source, a collimator, and a diffractive optical element configured to project a grid of points along a first axis; and
- a reflective surface positioned along the first axis and configured to reflect the grid of points along a second axis different than the first.

20. The at least one non-transitory storage media of claim 14, wherein the plurality of targets comprises a plurality of modular transfer function (MTF) targets.

* * * * *